United States Patent
Oohata

(10) Patent No.: US 8,798,883 B2
(45) Date of Patent: Aug. 5, 2014

(54) AUTOMATIC TRANSMISSION APPARATUS AND STRADDLE-TYPE VEHICLE EQUIPPED WITH THE APPARATUS

(71) Applicant: Yamaha Hatsudoki Kabushiki Kaisha, Iwata (JP)

(72) Inventor: Shinobu Oohata, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 83 days.

(21) Appl. No.: 13/688,288

(22) Filed: Nov. 29, 2012

(65) Prior Publication Data
US 2014/0046561 A1 Feb. 13, 2014

(30) Foreign Application Priority Data
Aug. 10, 2012 (JP) ................... 2012-178441

(51) Int. Cl.
G06F 7/00 (2006.01)
G06F 17/00 (2006.01)
G06F 19/00 (2011.01)
B60W 20/00 (2006.01)
F16H 61/68 (2006.01)

(52) U.S. Cl.
CPC .............. B60W 20/30 (2013.01); F16H 61/68 (2013.01)
USPC ........................................................ 701/65

(58) Field of Classification Search
CPC ................................ F16H 61/68; B60W 20/30
USPC ......................................................... 701/65
See application file for complete search history.

(56) References Cited

U.S. PATENT DOCUMENTS

| | | | |
|---|---|---|---|
| 8,229,637 B2 * | 7/2012 | Kobayashi et al. | 701/66 |
| 8,337,363 B2 * | 12/2012 | Minami | 477/180 |
| 2007/0240955 A1 * | 10/2007 | Zenno | 192/3.54 |
| 2010/0082210 A1 | 4/2010 | Kobayashi et al. | |
| 2013/0035833 A1 * | 2/2013 | Nozu et al. | 701/69 |

FOREIGN PATENT DOCUMENTS

| | | |
|---|---|---|
| DE | 10 2008 000 642 A1 | 9/2009 |
| FR | 2 905 437 A1 | 3/2008 |
| JP | 2010-078117 A | 4/2010 |

OTHER PUBLICATIONS

Official Communication issued in corresponding European Patent Application No. 12194768.3, mailed on Nov. 8, 2013.

* cited by examiner

*Primary Examiner* — Mary Cheung
*Assistant Examiner* — Frederick Brushaber
(74) *Attorney, Agent, or Firm* — Keating & Bennett, LLP

(57) ABSTRACT

An automatic transmission apparatus includes a transmission mechanism, an actuator arranged to rotate a shift drum, and a control device. The control device includes a determining unit arranged to detect a state of a straddle-type vehicle and to determine whether the straddle-type vehicle is in a first state in which an engaging force between the transmission gears is estimated to be equal to or greater than a predetermined value or in a second state in which the engaging force is estimated to be less than the predetermined value; a first gear shifting control unit arranged and programmed to control the actuator so that, if in the first state, the rotational speed of the shift drum becomes a first rotational speed; and a second gear shifting control unit arranged and programmed to control the actuator so that, if in the second state, the rotational speed of the shift drum becomes a second rotational speed that is lower than the first rotational speed.

13 Claims, 8 Drawing Sheets

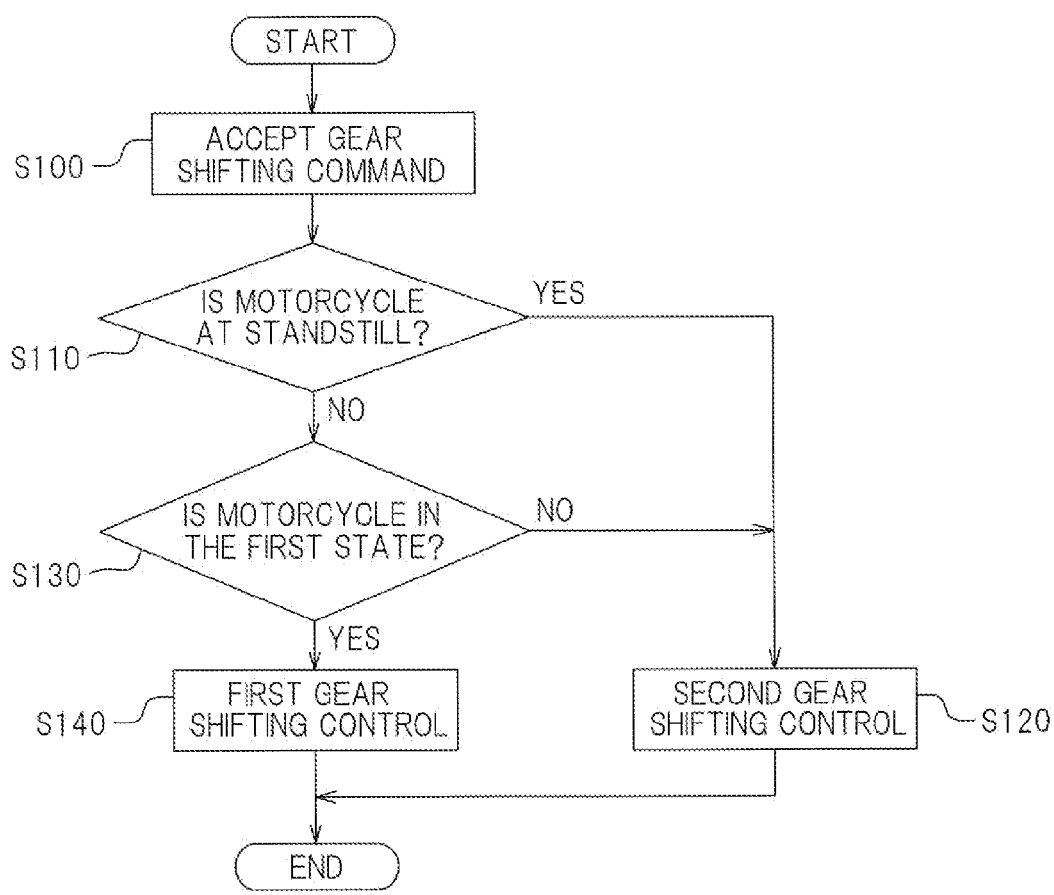

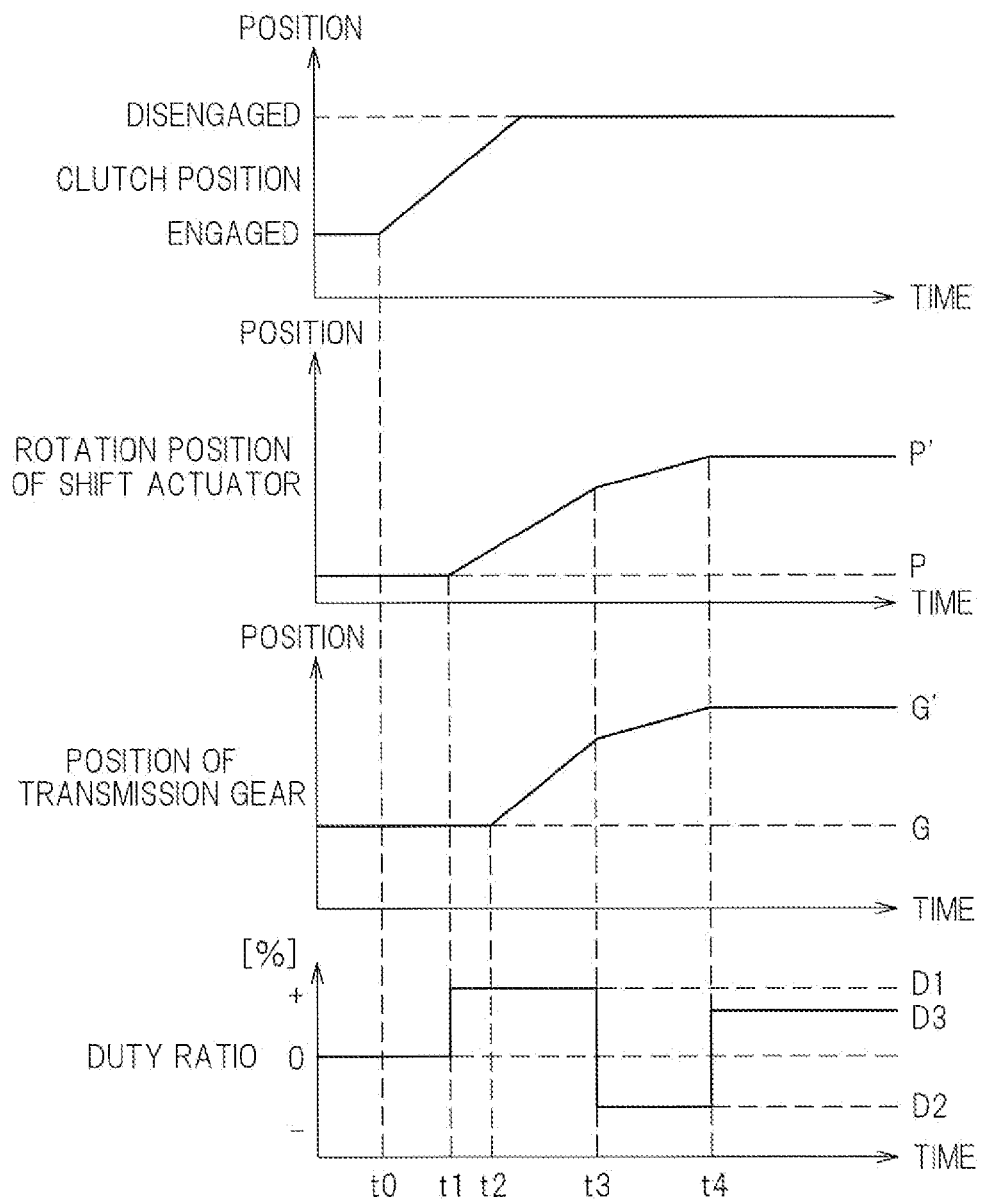

AUTOMATIC TRANSMISSION APPARATUS
AND STRADDLE-TYPE VEHICLE EQUIPPED
WITH THE APPARATUS

BACKGROUND OF THE INVENTION

1. Field of the Invention

The present invention relates to an automatic transmission apparatus and a straddle-type vehicle including the automatic transmission apparatus.

2. Description of the Related Art

Conventionally, straddle-type vehicles equipped with a multi-geared type transmission mechanism having a dog clutch are known. In recent years, straddle-type vehicles configured to perform gear shifting of the transmission mechanism using an actuator such as an electric motor have also become known. These types of straddle-type vehicles can eliminate the shifting operations by the rider and reduce the burden on the rider resulting from the shifting operations.

The multi-geared type transmission mechanism having a dog clutch is provided with a movable gear that can be moved in axial directions of a main shaft by a shift fork and a stationary gear that is immovable in the axial directions of the main shaft. Each of the movable gear and the stationary gear has an engaging portion including, for example, a protrusion or a recess. The protrusion and the recess define the dog clutch. When the engaging portion of the movable gear and the engaging portion of the stationary gear engage with each other, the movable gear and the stationary gear come into mesh with each other, and the movable gear and the stationary gear rotate integrally with each other. Upon gear shifting, the movable gear moves in one axial direction of the main shaft. In association with this movement, the engaging portion of the movable gear separates from the engaging portion of the stationary gear, which has engaged with the engaging portion of the movable gear, and another engaging portion of the movable gear comes into engagement with another engaging portion of the stationary gear. In the following description, the separation of an engaging portion (e.g., a protrusion) of the movable gear from an engaging portion (e.g., a recess) of the stationary gear is referred to as "dog disengagement". On the other hand, the engaging of an engaging portion of the movable gear with an engaging portion of the stationary gear is referred to as "dog engagement".

At the time of the dog engagement, it is possible that a clunking noise may occur. For example, the clunking noise occurs when the tip of the engaging portion of the movable gear hits the bottom part of the engaging portion of the stationary gear. When the moving speed of the movable gear is higher, this clunking noise tends to become louder. Accordingly, in order to reduce the clunking noise, it is conceivable to control the actuator so as to decrease the moving speed of the movable gear.

Japanese Unexamined Patent Application Publication JP 2010-078117 discloses a technique for suppressing the clunking noise in a transmission control apparatus provided with an electric motor for rotating a shift drum. In the above transmission control apparatus, the shift drum is rotated by duty-controlling the electric motor to perform the dog disengagement and the dog engagement. In the above transmission control apparatus, a control process of reducing a duty ratio is performed after the dog disengagement. More specifically, the higher the temperature of the lubricating oil for the shift drum, the smaller the duty ratio that is set. In addition, before the completion of the dog engagement, the duty ratio is set to 0% (i.e., the motor output is set to zero) so that the dog engagement is completed using only the rotary inertia of the shift drum.

If the relative rotational speed between the movable gear and the stationary gear is high and the moving speed of the movable gear is low in the dog engagement, the engaging portion of the movable gear may be repelled away by the engaging portion of the stationary gear. At this time, this repelling of the engaging portion of the movable gear and the engaging portion of the stationary gear results in noise. Then, the engaging portion of the movable gear that has been repelled away again approaches the engaging portion of the stationary gear, but it is in many cases repelled away again, and the same event may be repeated. As a consequence, the engaging portion of the movable gear and the engaging portion of the stationary gear may come into contact repeatedly, causing periodic noise. The above-mentioned transmission control apparatus has a risk of causing such periodic noise.

Moreover, as described above, it is possible that the clunking noise may occur also at the time of the dog engagement between the movable gear and the stationary gear. The periodic noise and the clunking noise are unpleasant to the rider. For this reason, the periodic noise and the clunking noise need to be reduced at the same time.

SUMMARY OF THE INVENTION

Preferred embodiments of the present invention control unpleasant noise at a time of dog engagement in an automatic transmission apparatus in which a multi-speed type transmission mechanism including a dog clutch is driven by an actuator.

The present inventor has discovered that, in the case that the relative rotational speed between a movable gear and a stationary gear (more specifically, the stationary gear that is the target of the dog engagement) is high in the dog engagement, the engaging force between the movable gear and the stationary gear (i.e., the stationary gear that is the target of dog disengagement) is great in the dog disengagement. That is, the present inventor has discovered that periodic noise tends to occur when the moving speed of the movable gear is low in the dog engagement if the engaging force is great. On the other hand, the present inventor has discovered that the noise does not occur even when the moving speed of the movable gear is lowered if the engaging force is small. Based on such discoveries, the present inventor has conceived of and developed preferred embodiments of the present invention described below.

An automatic transmission apparatus according to a preferred embodiment of the present invention is mounted to a straddle-type vehicle. The automatic transmission apparatus includes a multi-speed type transmission mechanism including a plurality of transmission gears that engage with each other via a dog clutch and changing a combination of the engaging transmission gears in association with rotation of a shift drum; an actuator arranged to rotate the shift drum; and a control device arranged and programmed to control the actuator. The control device includes a determining unit arranged to detect a state of the straddle-type vehicle and to determine whether the straddle-type vehicle is in a first state in which an engaging force between the transmission gears having engaged with each other before gear shifting is estimated to be equal to or greater than a predetermined value or in a second state in which the engaging force is estimated to be less than the predetermined value; a first gear shifting control unit arranged and programmed to control the actuator so that, if the determining unit determines that the straddle-type vehicle is in the first state, the rotational speed of the shift drum becomes a first rotational speed when the transmission gears come into engagement with each other; and a second gear shifting control unit arranged and programmed to control the actuator so that, if the determining unit determines that the straddle-type vehicle is in the second state, the rotational speed of the shift drum becomes a second rotational speed that is lower than the first rotational speed when the transmission gears come into engagement with each other.

This unique structure enables the following advantageous results. When the engaging force between the transmission gears having engaged with each other before gear shifting is great (i.e., is estimated to be equal to or greater than a predetermined value), the control device determines the state of the straddle-type vehicle to be the first state. When the state of the straddle-type vehicle is determined to be the first state, the control process of the first gear shifting control unit is executed, so the rotational speed of the shift drum becomes relatively high (the first rotational speed). As a result, periodic noise is prevented. In addition, when the engaging force is great, clunking noise at the time of the dog engagement is not so obtrusive. Thus, unpleasant noise is significantly reduced and prevented. On the other hand, when the engaging force between the transmission gears having engaged with each other before gear shifting is small (i.e., is estimated to be less than the predetermined value), the control device determines the state of the straddle-type vehicle to be the second state. When the state of the straddle-type vehicle is determined to be the second state, the control process of the second gear shifting control unit is executed, so the rotational speed of the shift drum becomes relatively low (the second rotational speed). As a result, clunking noise at the time of the dog engagement is reduced. When the above-mentioned engaging force is small, the periodic noise does not occur. Thus, unpleasant noise is significantly reduced and prevented.

In one preferred embodiment of the present invention, the determining unit detects, as the state of the straddle-type vehicle, whether or not the straddle-type vehicle is at a standstill, and if the straddle-type vehicle is at a standstill, the determining unit determines that the straddle-type vehicle is in the second state.

When at a standstill, the engaging force between the transmission gears having engaged with each other before gear shifting is small. With the determining unit having the above-described structure, the control process of the second gear shifting control unit is executed when at a standstill, and therefore, clunking noise at the time of the dog engagement can be reduced more suitably. Moreover, even if the gear shifting operation is somewhat slow, it is not a practical problem when the vehicle is at a standstill. For this reason, even if the rotational speed of the shift drum is set at the second rotational speed, no practical problem arises. Furthermore, when the vehicle is at a standstill, there is no such sound that occurs during driving, so the rider is more likely to experience the clunking noise at the time of the dog engagement. For this reason, the effect of reducing the clunking noise becomes more significant when using the determining unit with the above-described structure.

In another preferred embodiment of the present invention, the straddle-type vehicle includes an engine; a throttle valve disposed at an intake pipe of the engine, an engine rotational speed sensor arranged to detect the rotational speed of the engine; a throttle opening sensor arranged to detect the degree of opening of the throttle valve; and a gear shift position sensor arranged to detect the gear shift position of the transmission mechanism. The determining unit is configured to detect the state of the straddle-type vehicle based on the rotational speed of the engine, the degree of opening of the throttle valve, and the gear shift position of the transmission mechanism.

Since the determining unit uses the rotational speed of the engine, the degree of opening of the throttle valve, and the gear shift position of the transmission mechanism, the determining unit can detect the state of the straddle-type vehicle more accurately. The control device controls the rotational speed of the shift drum based on the result. Therefore, unpleasant noise can be reduced and prevented more effectively.

In another preferred embodiment of the present invention, the determining unit is configured to determine that the straddle-type vehicle is in the second state when the rotational speed of the engine is equal to or less than a threshold value. The threshold value is set to be greater when the degree of opening of the throttle valve is smaller and set to be greater when the gear shift position of the transmission mechanism is higher.

When the rotational speed of the engine is low (i.e., is equal to or less than a threshold value), the engaging force between the transmission gears having engaged with each other before gear shifting is small. With the determining unit having the above-described structure, the control process of the second gear shifting control unit is executed when the engine rotational speed is low, and therefore, clunking noise at the time of the dog engagement can be reduced and prevented more effectively. Moreover, by appropriately setting the threshold value based on the degree of opening of the throttle valve and the gear shift position of the transmission mechanism, it is possible to appropriately set the threshold value according to the driving condition of the straddle-type vehicle. As a result, the state of the straddle-type vehicle can be detected more reliably, and unpleasant noise can be reduced and prevented more effectively.

In another preferred embodiment of the present invention, the determining unit is configured to determine that the straddle-type vehicle is in the second state when the degree of opening of the throttle valve is equal to or less than a threshold value. The threshold value is set to be greater when the rotational speed of the engine is slower and set to be greater when the gear shift position of the transmission mechanism is higher.

When the degree of opening of the throttle valve is low (i.e., is equal to or less than a threshold value), the engaging force between the transmission gears having engaged with each other before gear shifting is small. With the determining unit having the above-described structure, the control process of the second gear shifting control unit is executed when the degree of opening of the throttle valve is low, and therefore, clunking noise at the time of the dog engagement can be reduced and prevented more effectively. Moreover, by appropriately setting the threshold value based on the rotational speed of the engine and the gear shift position of the transmission mechanism, it is possible to appropriately set the threshold value according to the driving condition of the straddle-type vehicle. As a result, the state of the straddle-type vehicle can be detected more reliably, and unpleasant noise can be reduced and prevented more effectively.

In another preferred embodiment of the present invention, the determining unit is configured to determine that the straddle-type vehicle is in the second state when the gear shift position of the transmission mechanism is equal to or higher than a threshold value. The threshold value is set to be smaller when the rotational speed of the engine is slower and set to be smaller when the degree of opening of the throttle valve is smaller.

When the gear shift position of the transmission mechanism is high (i.e., is equal to or higher than a threshold value), the engaging force between the transmission gears having engaged with each other before gear shifting is small. With the determining unit having the above-described structure, clunking noise at the time of the dog engagement can be reduced and prevented more effectively because the control process of the second gear shifting control unit is executed when the gear shift position of the transmission mechanism is high. Moreover, by appropriately setting the threshold value based on the rotational speed of the engine and the degree of opening of the throttle valve, it is possible to appropriately set the threshold value according to the driving condition of the straddle-type vehicle. As a result, the state of the straddle-type vehicle can be detected more reliably, and unpleasant noise can be reduced and prevented more effectively.

In another preferred embodiment of the present invention, each of the first gear shifting control unit and the second gear shifting control unit is arranged and programmed to cause the actuator to operate at a constant speed. The operating speed of the actuator controlled by the second gear shifting control unit is lower than the operating speed of the actuator controlled by the first gear shifting control unit.

By allowing the actuator to operate at a constant speed in this way, the actuator can be controlled with a simpler configuration than in the case where the actuator is decelerated at a middle point (for example, before the dog engagement). In addition, the operating speeds of the actuator controlled by the first gear shifting control unit and the second gear shifting control unit can be set with a simpler configuration.

In another preferred embodiment of the present invention, the second gear shifting control unit is arranged and programmed to operate the actuator at a first operating speed and thereafter operate the actuator at a second operating speed that is slower than the first operating speed.

With this configuration, the actuator is operated at the first operating speed, which is relatively faster, at the time of dog disengagement. Therefore, the dog disengagement can be made easy. On the other hand, at the time of the dog engagement, the actuator is operated at the second operating speed, which is relatively slower (i.e., slower than the first operating speed). Therefore, the clunking noise at the time of the dog engagement can be significantly reduced. The time necessary for the gear shifting operation can be shortened in comparison with the case where the actuator is operated at the second operating speed from the start of the dog disengagement to the completion of the dog engagement.

In another preferred embodiment of the present invention, the actuator includes an electric motor. The first gear shifting control unit executes a position feedback control process so that a rotational position of the electric motor changes from a current position to a first target rotational position. The second gear shifting control unit executes the position feedback control process so that the rotational position of the electric motor changes to a second target rotational position closer to the current position than the first target rotational position.

With this configuration, the rotational speed of the shift drum can be changed by a simple technique, that is, by changing the target position in the position feedback control process.

In another preferred embodiment of the present invention, the actuator includes an electric motor. The second gear shifting control unit drives the electric motor with a first duty ratio and thereafter drives the electric motor with a second duty ratio that is less than the first duty ratio.

With this configuration, the electric motor is driven with the first duty ratio, which is relatively greater, at the time of dog disengagement, and therefore, the dog disengagement can be made easy. On the other hand, at the time of the dog engagement, the electric motor is operated with the second duty ratio, which is relatively smaller (i.e., less than the first duty ratio). Therefore, the clunking noise at the time of the dog engagement can be significantly reduced and prevented.

In another preferred embodiment of the present invention, the actuator includes an electric motor. The second gear shifting control unit drives the electric motor with one of a positive duty ratio and a negative duty ratio and thereafter drives the electric motor with the other one of the duty ratios.

This enables application of a greater braking force to the electric motor at the time of the dog engagement. As a result, clunking noise at the time of the dog engagement can be reduced and prevented more effectively.

In another preferred embodiment of the present invention, the automatic transmission apparatus includes a clutch arranged to transmit and interrupt power of an engine of the straddle-type vehicle; and another actuator arranged to drive the clutch. The first gear shifting control unit and the second gear shifting control unit are arranged and programmed to allow the shift drum to start rotating after the other actuator starts disengaging the clutch but before the other actuator finishes disengaging the clutch.

When the clutch operation and the shift operation are performed at the same time (in other words, in an overlapping manner), the clutch disengagement has not been completed at the time of dog disengagement, so the dogs tend to be difficult to disengage. For this reason, when the engaging force between the transmission gears is great, the time it takes for disengaging the dogs tends to be longer, and the overall time of the gear shifting operation tends to be longer. However, according to a preferred embodiment of the present invention, when the engaging force between the transmission gears is great, the first gear shifting control unit is selected, so the time it takes for dog engagement can be made shorter. As a result, it is possible to prevent the overall time of the gear shifting operation from getting longer.

In another preferred embodiment of the present invention, a straddle-type vehicle including an automatic transmission apparatus having the structure as described above is provided.

This makes it possible to provide a straddle-type vehicle equipped with the above-described automatic transmission apparatus that can significantly reduce and prevent clunking noises and the periodic noise at the time of the dog engagement.

The present invention makes it possible to significantly reduce and prevent unpleasant noise at the time of dog engagement in the automatic transmission apparatus in which a multi-speed type transmission mechanism including a dog clutch is driven by an actuator.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a flow chart illustrating the control process of an automatic transmission apparatus according to the first preferred embodiment of the present invention.

FIG. 8 shows charts showing changes over time of the clutch position, the rotational position of the shift actuator, the position of the transmission gear, and the duty ratio, in a second gear shifting control process according to a second preferred embodiment of the present invention.

DETAILED DESCRIPTION OF THE PREFERRED EMBODIMENTS

Hereinbelow, preferred embodiments of the present invention will be described. It should be noted that the other matters not specifically mentioned in this description but necessary to implement the present invention can be understood as design variations by a skilled person based on the prior art in the technical field. The present invention may be implemented based on the content disclosed herein and the common technical knowledge in the field.

Figure 1:
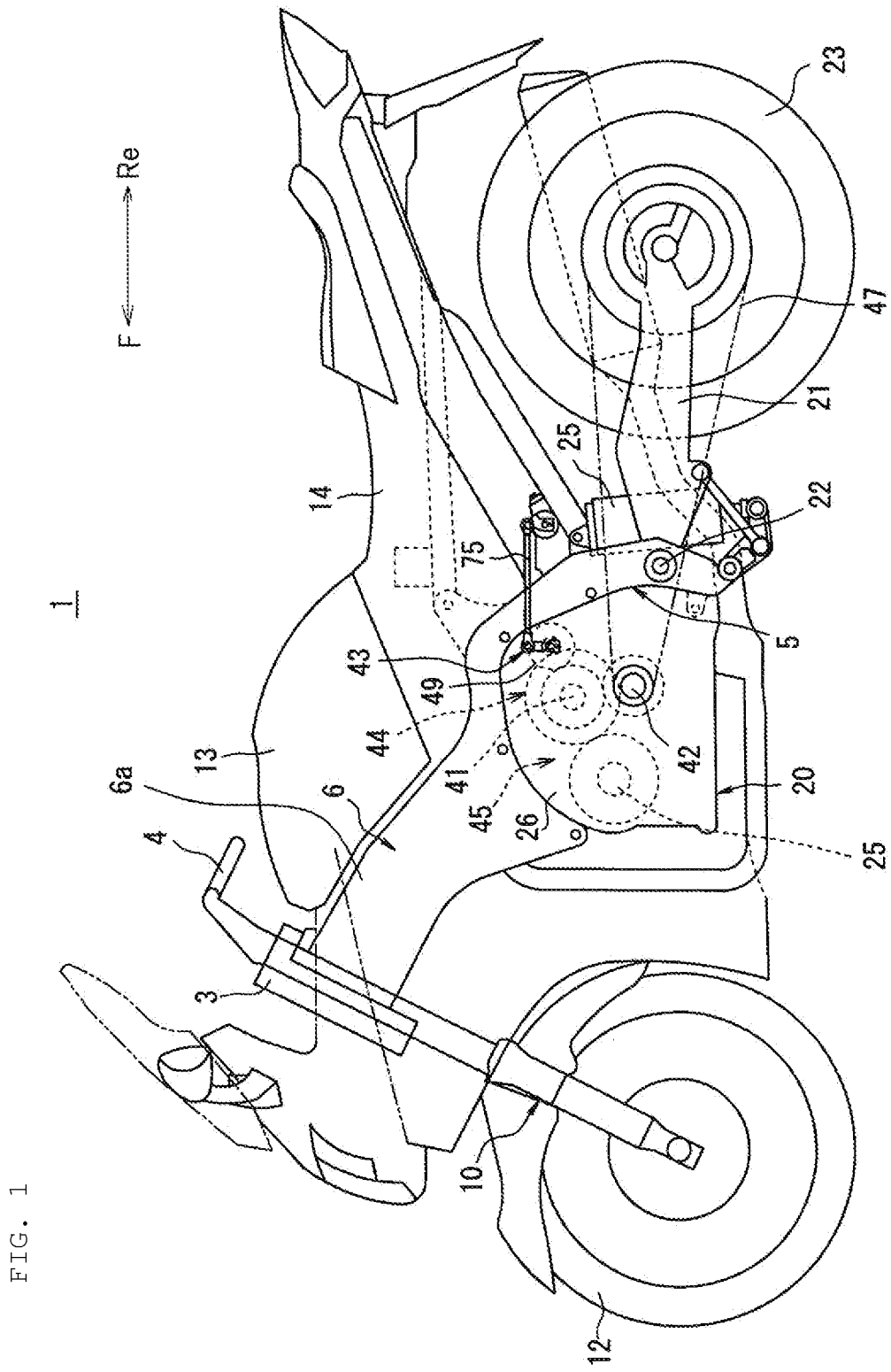
FIG. 1 is a side view of a motorcycle according to a first preferred embodiment of the present invention.

Hereinbelow, a motorcycle equipped with an automatic transmission apparatus according to a preferred embodiment of the present invention will be described with reference to the drawings. FIG. 1 is a side view illustrating a motorcycle 1. In the present description, the terms "front," "rear," "left," and "right" respectively refer to front, rear, left, and right as defined based on the perspective of the rider seated on a later-described seat 14. Reference characters F and Re in the drawings indicate front and rear, respectively.

The motorcycle 1 is one example of the straddle-type vehicle according to the present preferred embodiment. The motorcycle 1 is what is called an on-road type motorcycle. For example, the straddle-type vehicle according to a preferred embodiment of the present invention may be any type of motorcycle including an off-road type motorcycle, a sport bike type motorcycle, a scooter type motorcycle, and a moped type motorcycle. The straddle-type vehicle according to the present invention is not limited to the motorcycle 1. For example, the straddle-type vehicle according to the present invention may be an ATV, a four-wheeled all-terrain vehicle, and the like.

As illustrated in FIG. 1, the motorcycle 1 includes a head pipe 3 and a body frame 6. The body frame 6 includes a pair of left and right frame unit 6a extending rearward the head pipe 3. In FIG. 1, of the frame portions, only the frame portion 6a is depicted. A rear portion of the frame portion 6a extends downward. A rear-arm bracket 5 is connected to a rear portion of the frame portion 6a. A front end portion of a rear arm 21 is connected to the rear-arm bracket 5 via a pivot shaft 22. The rear arm 21 is supported vertically swingably by the pivot shaft 22. A rear wheel 23 is supported at a rear end portion of the rear arm 21.

A fuel tank 13 is disposed above the frame portion 6a. A seat 14 for the rider to be seated is disposed at the rear of the fuel tank 13.

A front fork 10 is supported rotatably by the head pipe 3. A handle bar 4 is provided at the upper end of the front fork 10. A shift switch (not shown) is provided on the handlebar 4. The shift switch includes a shift-up switch and a shift-down switch. The shift switch can increase or decrease the shift position from between neutral and the top gear position (for example, the 6-th gear position) by manual operation. A front wheel 12 is provided rotatably at a lower end of the front fork 10.

Figure 2:
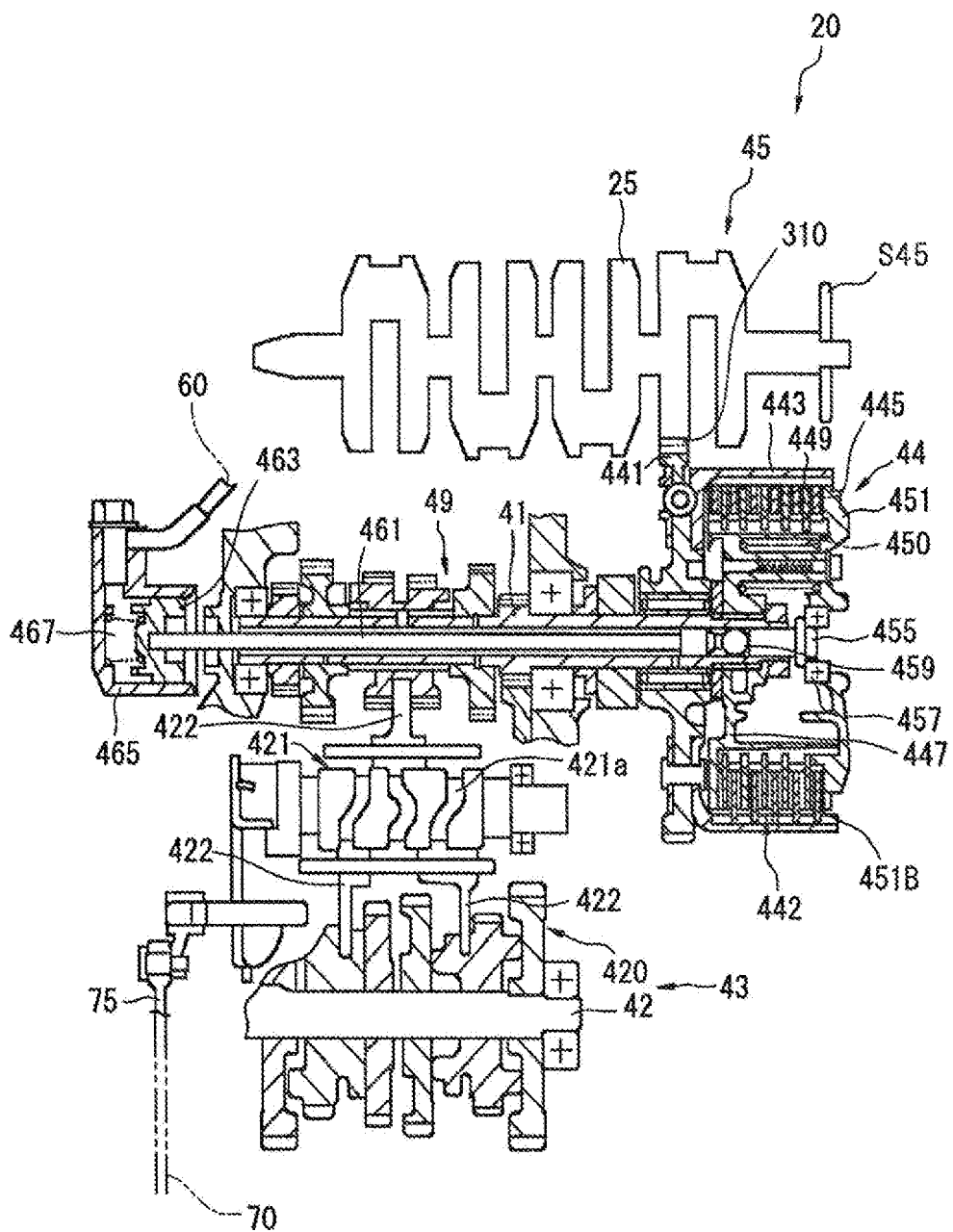
FIG. 2 is a cross-sectional view illustrating an internal structure of a power unit according to the first preferred embodiment of the present invention.

A power unit 20 is mounted on the frame portion 6a and the rear-arm bracket 5 in a suspended manner. FIG. 2 is a cross-sectional view illustrating an internal structure of the power unit 20. As illustrated in FIG. 2, the power unit 20 at least includes an engine 45, a clutch 44, and a transmission mechanism 43. The engine 45, the clutch 44, and the transmission mechanism 43 are assembled integrally to a crankcase 26 (see FIG. 1).

The engine 45 according to the present preferred embodiment preferably is an internal combustion engine that uses gasoline as the fuel. However, the engine 45 is not limited to the internal combustion engine such as a gasoline engine. The engine 45 may be an electric motor engine or the like. The engine 45 may also be one in which a gasoline engine and an electric motor engine are combined. The engine 45 includes a crankshaft 25.

The crankshaft 25 is coupled to a main shaft 41 via the clutch 44. The main shaft 41 is arranged parallel or substantially parallel to the crankshaft 25. The main shaft 41 is also arranged parallel or substantially parallel to a drive shaft 42.

The clutch 44 in the present preferred embodiment preferably is, for example, a multiple friction plate clutch. The clutch 44 includes a clutch housing 443 and a clutch boss 447. A plurality of friction plates 445 are provided in the clutch housing 443. A plurality of clutch plates 449 are provided outside the clutch boss 447. Each of the friction plates 445 is fixed to the clutch housing 443 with respect to the direction of rotation of the main shaft 41. This means that the plurality of friction plates 445 rotate together with the clutch housing 443. The plurality of friction plates 445 are displaceable with respect to the axial direction of the main shaft 41. The plurality of friction plates 445 are arrayed along the axial direction of the main shaft 41.

Each of the clutch plates 449 faces an adjacent one of the friction plates 445. Each of the clutch plates 449 is fixed to the clutch boss 447 with respect to the direction of rotation of the main shaft 41. As a result, the plurality of clutch plates 449 rotate together with the clutch boss 447. The plurality of clutch plates 449 are displaceable with respect to the axial direction of the main shaft 41. In the present preferred embodiment, the plurality of friction plates 445 and the plurality of clutch plates 449 define a plate assembly 442.

As illustrated in FIG. 2, a pressure plate 451 is disposed vehicle-widthwise outward of the main shaft 41 (i.e., on the right in FIG. 2). The pressure plate 451 preferably is substantially disc-shaped. A pressing portion 451B projecting toward the plate assembly 442 side is provided in a radially outward portion of the pressure plate 451. The pressing portion 451B faces the friction plate 445 that is located on the rightmost side of the plate assembly 442.

The clutch 44 is provided with a spring 450. The spring 450 urges the pressure plate 451 vehicle-widthwise inwardly (i.e., leftward in FIG. 2). In other words, the spring 450 urges the pressure plate 451 in a direction in which the pressing portion 451B presses the plate assembly 442.

A center portion of the pressure plate 451 is engaged with one end portion (the right end portion in FIG. 2) of a push rod 455 via a bearing 457. This allows the pressure plate 451 to be rotatable relative to the push rod 455. Note that the main shaft 41 preferably has a tubular shape. The other end portion (the left end portion) of the push rod 455 is accommodated inside the main shaft 41. Inside the main shaft 41, a spherical ball 459 is provided adjacent to the other end portion (the left end portion) of the push rod 455. Further inside the main shaft 41, a push rod 461 is provided adjacently to the ball 459.

A left end portion of the push rod 461 protrudes from the main shaft 41. A piston 463 preferably is provided integrally with the left end portion of the push rod 461. The piston 463 is guided by the cylinder main body 465, and it is slidable in the axial directions of the main shaft 41.

The clutch 44 is driven by a clutch actuator 60. In the present preferred embodiment, the clutch actuator 60 preferably is an electric motor, but the clutch actuator 60 is not limited to the electric motor. The clutch actuator 60 drives the clutch 44 so that the clutch 44 can be engaged and disengaged. When the clutch actuator 60 is actuated, lubrication oil is supplied into a space 467 surrounded by the piston 463 and the cylinder main body 465. When lubrication oil is supplied into the space 467, the piston 463 is pushed and shifted rightward in FIG. 2. As a result, the piston 463 pushes the pressure plate 451 rightward in FIG. 2, via the push rod 461, the ball 459, the push rod 455, and the bearing 457. When the pressure plate 451 is pushed rightward in FIG. 2, the pressing portion 451B of the pressure plate 451 is separated from the friction plates 445, and the clutch 44 is brought into a disengaged state.

At the time when the clutch 44 is engaged, the pressure plate 451 is moved leftward in FIG. 2 by the spring 450. When the pressure plate 451 moves leftward in FIG. 2, the pressing portion 451B presses the plate assembly 442 leftward. As a result, the friction plates 445 and the clutch plates 449 in the plate assembly 442 are brought into pressure contact with each other. Thereby, the clutch 44 is brought into an engaged state.

On the other hand, in the disengaged state of the clutch 44, the pressure plate 451 is moved rightward in FIG. 2 by the push rod 451. Then, the pressing portion 451B of the pressure plate 451 is separated from the plate assembly 442. In the state in which the pressing portion 451B is separated from the plate assembly 442, the friction plates 445 and the clutch plates 449 are not in pressure contact with each other. A slight clearance is provided between each of the friction plates 445 and each of the clutch plates 449. Therefore, a friction force that can transmit a drive force does not occur between the friction plates 445 and the clutch plates 449.

Thus, the pressure plate 451 moves in one of the axial directions of the main shaft 41 or in the other direction according to the magnitude relationship between the drive force of the clutch actuator 60 and the urging force of the spring 450. According to the above-described movement, the clutch 44 is brought into an engaged state or a disengaged state.

A gear 310 is supported integrally on the crankshaft 25 of the engine 45. A gear 441 that meshes with the gear 310 is supported on the main shaft 41. The gear 441 is rotatable relative to the main shaft 41. The gear 441 is provided integrally with, for example, the clutch housing 443. As a result, the torque of the engine 45 is transmitted from the crankshaft 25 via the gear 441 to the clutch housing 443. Also, the torque of the engine 45 is transmitted the clutch housing 443 to the clutch boss 447 by the friction force produced between the plurality of friction plates 445 and the plurality of clutch plates 449. The clutch boss 447 and the main shaft 41 rotate integrally with each other. This means that there is no relative rotation between the clutch boss 447 and the main shaft 41. Therefore, when the clutch 44 is engaged, the torque of the engine 45 is transmitted to the main shaft 41.

The push rod 455 is not limited to a push rod that pushes the pressure plate 451 rightward in FIG. 2 by a mechanism inserted in the main shaft 41. The push rod 455 may be a push rod that pulls the pressure plate 451 rightward in FIG. 2 by a mechanism provided vehicle-widthwise outward (i.e., rightward in FIG. 2) of the pressure plate 451.

The clutch 44 may not be a multiple plate clutch but may be a single plate clutch, for example. The clutch 44 may also be provided with a centrifugal weight. In this case, the clutch 44 is engaged/disengaged by actuation of the clutch actuator 60 and the centrifugal force of the centrifugal weight.

Next, the configuration of the transmission mechanism 43 will be described in detail. The transmission mechanism 43 according to the present preferred embodiment preferably is what is called a dog clutch type transmission mechanism, and a multi-speed type transmission mechanism, for example. The transmission mechanism 43 includes later-described transmission gears 49 and 420, a shift drum 421, and a shift fork 422.

A plurality of transmission gears 49 are attached to the main shaft 41. On the other hand, a plurality of transmission gears 420 that correspond to the above-mentioned plurality of transmission gears 49 are attached to the drive shaft 42. Of the plurality of transmission gears 49 and the plurality of transmission gears 420, only selected one or more of the transmission gears 49 and 420 are engaged with each other. At least one of the transmission gears 49 other than the selected one of the transmission gears 49 and the transmission gears 420 other than the selected one of the transmission gears 420 is allowed to be rotatable relative to the main shaft 41 or the drive shaft 42. In other words, at least one of the non-selected transmission gears 49 and the non-selected transmission gears 420 is allowed to spin freely relative to the main shaft 41 or the drive shaft 42. The transmission of rotation between the main shaft 41 and the drive shaft 42 is carried out only through the selected transmission gear 49 and the selected transmission gear 420 that mesh with each other.

The selection of the transmission gear 49 or transmission gear 420 is performed by the shift drum 421. A plurality of cam grooves 421a are located in the outer circumferential surface of the shift drum 421. A shift fork 422 is fitted to each of the cam grooves 421a. Each shift fork 422 engages with a predetermined transmission gear 49 of the main shaft 41 and a predetermined transmission gear 420 of the drive shaft 42. In response to rotation of the shift drum 421, each of the plurality of shift forks 422 is guided by the cam grooves 421a to move in an axial direction of the main shaft 41. As a result, of the transmission gears 49 and 420, the gears to be engaged with each other are selected. More specifically, of the plurality of transmission gears 49 and the plurality of transmission gears 420, only the pair of gears that is located at the position corresponding to the rotation angle of the shift drum 421 is brought into a fixed state relative to the main shaft 41 and the drive shaft 42 by a spline. Thereby, the gear position in the transmission mechanism 43 is determined. As a result, the transmission of rotation is carried out between the main shaft 41 and the drive shaft 42 through the transmission gear 49 and the transmission gear 420 at a predetermined transmission gear ratio. The shift drum 421 is rotated only by a predetermined angle by a shift rod 75 moving back and forth.

Switching of the transmission gears of the transmission mechanism 43, in other words, a change of the gear position of the transmission mechanism 43, is performed by actuation of the shift actuator 70. In the present preferred embodiment, the shift actuator 70 is an electric motor, but the shift actuator 70 is not limited to the electric motor. The shift actuator 70 is connected to the shift drum 421 via the shift rod 75. The shift rod 75 is driven by the shift actuator 70 to thereby move back and forth.

With such a configuration as described above, when the engine 45 is operated under the condition in which a predetermined pair of transmission gear 49 and transmission gear 420 are fixed respectively to the main shaft 41 and the drive shaft 42 and the clutch 44 is brought into an engaged state, the torque of the engine 45 is transmitted to the main shaft 41 via the clutch 44. Also, the transmission of rotation is carried out at a predetermined transmission gear ratio between the main shaft 41 and the drive shaft 42 via the predetermined pair of transmission gear 49 and transmission gear 420, so that the drive shaft 42 is rotated. When the drive shaft 42 is rotated, the torque is transmitted by a power transmission mechanism 47 (see FIG. 1) that connects the drive shaft 42 to a rear wheel 23 (see FIG. 1), so that the rear wheel 23 is rotated.

Figure 3:
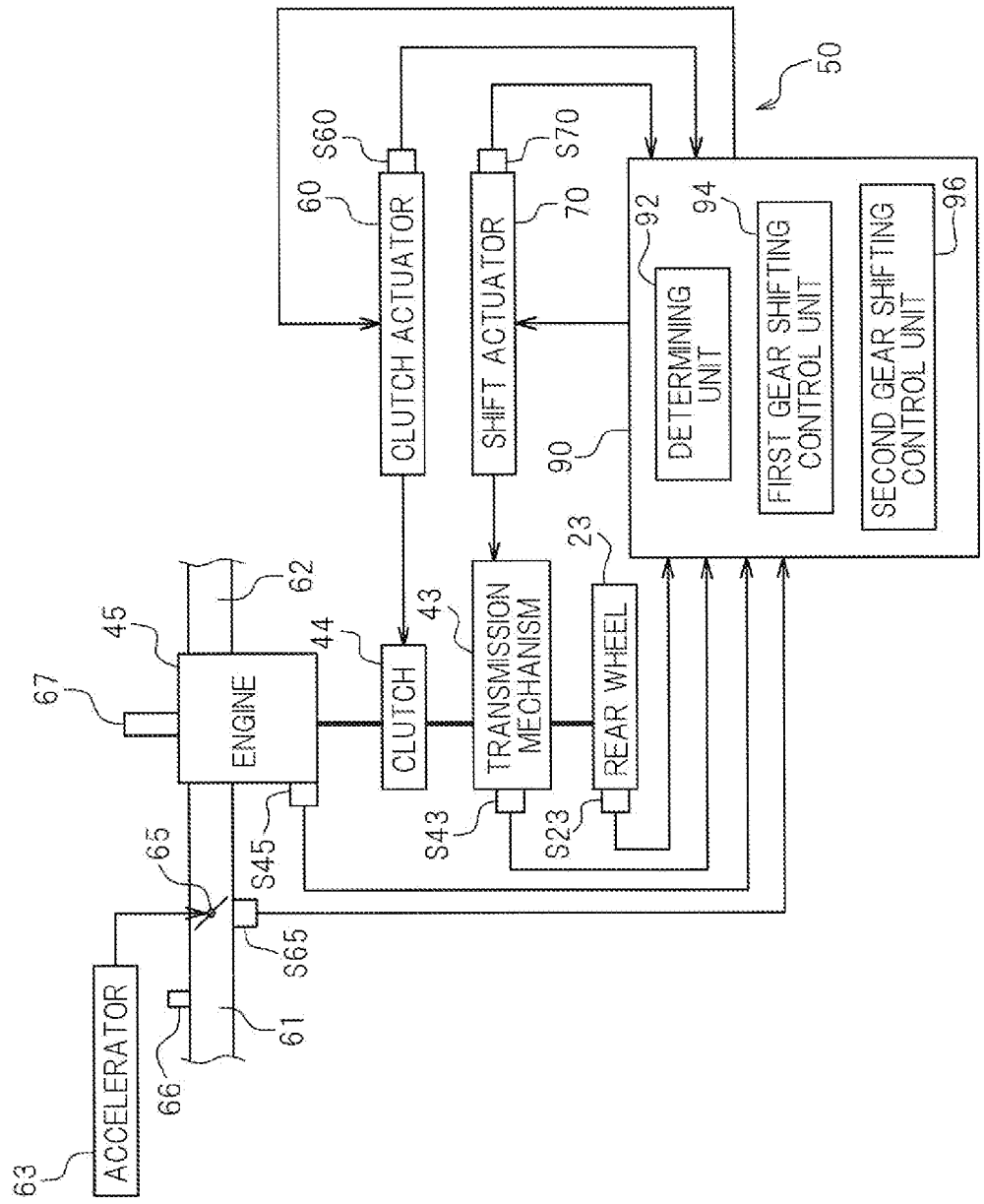
FIG. 3 is a block diagram illustrating main elements of the motorcycle according to the first preferred embodiment of the present invention.

FIG. 3 is a block diagram showing main elements of the motorcycle 1. The motorcycle 1 includes the engine 45, the clutch 44, and the transmission mechanism 43. An intake pipe 61 and an exhaust pipe 62 are connected to the engine 45. The engine 45 is provided with an ignition device 67. A throttle valve 65 is disposed in the intake pipe 61. The throttle valve 65 adjusts the amount and speed of the air flowing through the intake pipe 61. An accelerator 63 that drives the throttle valve 65 is provided on the right handle bar of the motorcycle 1. A fuel supply system 66 arranged to supply fuel is provided on the intake pipe 61. The type of the fuel supply system 66 is not particularly limited. A fuel injection system, a carburetor, or the like may be suitably used for the fuel supply system 66.

Next, an automatic transmission apparatus 50 according to the present preferred embodiment will be described below. As illustrated in FIG. 3, the automatic transmission apparatus 50 has the clutch 44, the transmission mechanism 43, the clutch actuator 60, and the shift actuator 70. The automatic transmission apparatus 50 also includes an ECU (Electric Control Unit) 90 as a control device arranged and programmed to control the clutch actuator 60 and the shift actuator 70. The ECU 90 controls not only the clutch actuator 60 and the shift actuator 70 but also the engine 45.

The automatic transmission apparatus 50 includes an engine rotational speed sensor S45, a throttle opening sensor S65, a gear shift position sensor S43, and a vehicle speed sensor S23. The engine rotational speed sensor S45 detects the rotational speed of the engine 45 (more specifically, the rotational speed of the crankshaft 25 of the engine 45). The throttle opening sensor S65 detects the degree of opening of the throttle valve 65. The gear shift position sensor S43 detects the gear shift position of the transmission mechanism 43. The vehicle speed sensor S23 detects the vehicle speed of the motorcycle 1. In the present preferred embodiment, the vehicle speed sensor S23 preferably is configured to detect the rotational speed of the rear wheel 23. The vehicle speed is preferably detected based on the rotational speed of the rear wheel 23. However, the method of detecting the vehicle speed is not particularly limited.

The automatic transmission apparatus 50 further includes a clutch actuator sensor S60 arranged to detect the driving amount of the clutch actuator 60 and a shift actuator sensor S70 arranged to detect the driving amount of the shift actuator 70. In the present preferred embodiment, each of the clutch actuator 60 and the shift actuator 70 preferably is defined by an electric motor, for example. The clutch actuator sensor S60 and the shift actuator sensor S70 are configured to detect the rotation angles of the respective electric motors. For example, a potentiometer can be used suitably for the clutch actuator sensor S60 and the shift actuator sensor S70. The shift actuator sensor S70 may either be a separate element from the shift actuator 70 or integrated with the shift actuator 70. One example of the shift actuator 70 and the shift actuator sensor S70 that are integrated with each other is a servomotor that is capable of detecting rotation angle. Similarly, the clutch actuator sensor S60 may either be a separate element from the clutch actuator 60 or integrated with the clutch actuator 60. It is also possible to use a servomotor as the clutch actuator 60 and the clutch actuator sensor S60.

Instead of providing the clutch actuator 60 and the shift actuator 70 separately, it is also possible to a single actuator for driving both the clutch 44 and the transmission mechanism 43. In this case, in place of the clutch actuator sensor S60 and the shift actuator sensor S70, it is possible to provide a single sensor arranged to detect the driving amount of the single actuator.

The engine rotational speed sensor S45, the throttle opening sensor S65, the gear shift position sensor S43, and the vehicle speed sensor S23 are each connected to the ECU 90. Also, the clutch actuator sensor S60 and the shift actuator sensor S70 are each connected to the ECU 90. The ECU 90 is supplied with respective signals from the engine rotational speed sensor S45, the throttle opening sensor S65, the gear shift position sensor S43, the vehicle speed sensor S23, the clutch actuator sensor S60, and the shift actuator sensor S70. The ECU 90 is connected to the clutch actuator 60 and the shift actuator 70. The ECU 90 outputs a control signal to the clutch actuator 60 and the shift actuator 70.

Figure 4:
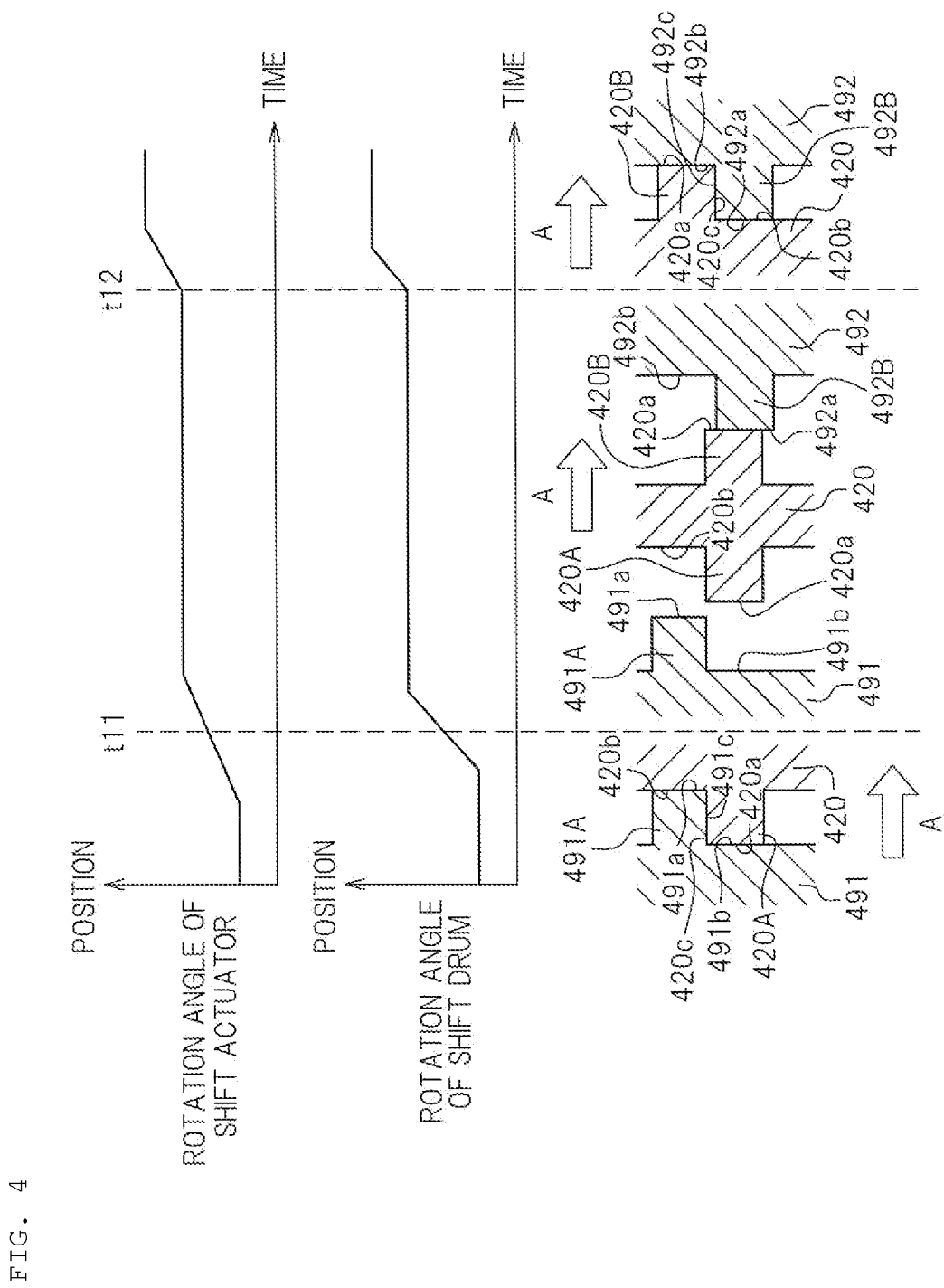
FIG. 4 is a view schematically illustrating changes in a rotation angle of a shift actuator, changes in a rotation angle of a shift drum, and dog disengagement, dog hitting, and dog engagement of transmission gears.

It should be noted that in the multi-speed type transmission mechanism 43 including a dog clutch, clunking noise may occur when the transmission gears 49 and 420 are engaged with each other. For example, the clunking noise occurs when the transmission gears 49 and 420 collide with each other. The automatic transmission apparatus 50 according to the present preferred embodiment is an apparatus that significantly reduces and prevents the unpleasant noise that occurs when the transmission gears 49 and 420 come into engagement with each other. FIG. 4 is a view schematically illustrating change in the rotation angle of the shift actuator 70, change in the rotation angle of the shift drum 421, and the dog disengagement, dog hitting, and dog engagement of the transmission gears 49 and 420. In the following description, it is assumed that the transmission gear 49 does not move but the transmission gear 420 moves. Among the transmission gears 49, one that has been engaged with the transmission gear 420 before gear shifting is referred to as a transmission gear 491. On the other hand, one that is to be engaged with the transmission gear 420 after gear shifting is referred to as a transmission gear 492. It should be noted, however, that a transmission gear with which the transmission gear 491 that has been engaged before gear shifting and a transmission gear with which the transmission gear 492 to be engaged after gear shifting may either be the same transmission gear (in this case, the transmission gear 420) or be different transmission gears. In the description of the present preferred embodiment, it is assumed that the transmission gears 491 and 492 are in engagement with the same transmission gear before and after gear shifting.

When the shift actuator 70 is actuated, the shift drum 421 starts to rotate. In response to rotation of the shift drum 421, the transmission gear 420 moves in a direction A, as illustrated in FIG. 4. That is, the transmission gear 420 moves away from the transmission gear 491 which has been engaged with before gear shifting, and moves closer to the transmission gear 492 which is to be engaged with after gear shifting. Before gear shifting, the drive force is transmitted mainly from the transmission gear 491 to the transmission gear 420, and a side surface 420c of an engaging portion 420A of the transmission gear 420 and a side surface 491c of engaging portion 491A of the transmission gear 491 are pressed against each other. At the time of gear shifting, the drive force weakens by disengaging the clutch 44, and the pressing force between the side surface 420c of the engaging portion 420A of the transmission gear 420 and the side surface 491c of the engaging portion 491A of the transmission gear 491 becomes weaker. Thus, the engaging force between the engaging portion 420A and the engaging portion 491A becomes weaker, so the transmission gear 420 can move in the direction A more easily. Then, in the middle of the rotation of the shift drum 421 (see time t11), the engaging portion 420A that has slipped on the side surface 491c of the engaging portion 491A separates from the side surface 491c. That is, the transmission gear 420 separates from the transmission gear 491. The separation of the engaging portion 420A of the transmission gear 420 and the engaging portion 491A of the transmission gear 491, which have been engaged with each other before gear shifting, is referred to as "dog disengagement". The greater the drive force of the shift actuator 70 is, the easier the dog disengagement is performed, and the faster the rotational speed of the shift drum 421 becomes.

After the completion of the dog disengagement at time t11, the transmission gear 420 moves further in the direction A. Thereafter, the transmission gear 420 and the transmission gear 492 come into engagement with each other. That is, an end 420a of an engaging portion 420B of the transmission gear 420 moves rightward of an end 492a of an engaging portion 492B of the transmission gear 492. This is referred to as "dog engagement". Typically, the side surface 420c of the engaging portion 420B and a side surface 492c of the engaging portion 492B come into contact with each other. When the dog engagement is performed, clunking noise may occur. For example, clunking noise occurs because the end 420a of the engaging portion 420B of the transmission gear 420 collides with a bottom surface 492b of the transmission gear 492. This clunking noise tends to become louder as the moving speed of the transmission gear 420 becomes higher.

Meanwhile, since the transmission gear 420 and the transmission gear 492 are in relative rotation, the vertical positions of the engaging portion 492B and the engaging portion 420B are not always staggered at the time of the dog engagement. It is possible that at least a portion of the engaging portion 492B may be positioned rightward of at least a portion of the engaging portion 420B. In such a case, the end 420a of the engaging portion 420B and the end 492a of the engaging portion 492B collide with each other. This is referred to as "dog hitting".

However, even when dog hitting occurs, the end 420a of the engaging portion 420B slips against the end 492a of the engaging portion 492B as long as the transmission gear 420 moves in the direction A at a sufficient speed, because the transmission gear 420 and the transmission gear 492 further relatively rotate with each other. Thus, dog engagement is accomplished eventually.

Nevertheless, if the relative rotational speed between the transmission gear 420 and the transmission gear 492 is high and the moving speed of the transmission gear 420 in the direction A is low, the engaging portion 420B may be repelled by the engaging portion 492B when the dog hitting occurs. Then, the engaging portion 420B that has once been repelled moves closer to the engaging portion 492B again, but in any case, it is repelled again and the same phenomenon may be repeated. As a consequence, the engaging portion 420B and the engaging portion 492B come into contact repeatedly, causing periodic noise. Such periodic noise tends to occur more easily when the relative rotational speed between the transmission gear 420 and the transmission gear 492 is higher, and when the moving speed of the transmission gear 420 is lower.

The automatic transmission apparatus 50 according to the present preferred embodiment is capable of reducing the above-described periodic noise and the above-described clunking noise. As illustrated in FIG. 3, the ECU 90 includes a determining unit 92 arranged to determine whether the motorcycle 1 is in a later-described first state or in a later-described second state, a first gear shifting control unit 94 arranged and programmed to execute a first gear shifting control process if the determining unit 92 determines that the motorcycle 1 is in the first state, and a second gear shifting control unit 96 arranged and programmed to execute a second gear shifting control process if the determining unit 92 determines that the motorcycle 1 is in the second state.

The determining unit 92 determines whether the engaging force between the transmission gear 49 and the transmission gear 420 that have been engaged with each other before gear shifting is small or great. It is difficult to detect the just-mentioned engaging force directly. For this reason, the determining unit 92 determines the magnitude of the engaging force based on the state of motorcycle 1. Here, the determining unit 92 determines whether the motorcycle 1 is in a first state in which the above-mentioned engaging force is estimated to be equal to or greater than a predetermined value or in a second state in which the above-mentioned engaging force is estimated to be less than the predetermined value.

When the engaging force between the transmission gear 49 and the transmission gear 420 is great, the relative rotational speed between the transmission gear 49 and the transmission gear 420 after the dog disengagement is high. For this reason, when the rotational speed of the shift drum 421 is low, the engaging portions of the transmission gear 49 and the transmission gear 420 tend to repel each other easily. Accordingly, when the rotational speed of the shift drum 421 is low, the periodic noise at the time of the dog engagement tends to occur easily. On the other hand, when the engaging force between the transmission gear 49 and the transmission gear 420 is great, the engine rotational speed is high in many cases, so the clunking noise at the time of the dog engagement is rarely noticeable in comparison with the engine sound even if the rotational speed of the shift drum 421 is high. So, if the state of the motorcycle 1 is determined to be the first state, the first gear shifting control unit 94 executes the first gear shifting control process in which the shift actuator 70 is controlled such that the rotational speed of the shift drum 421 becomes relatively fast.

When the engaging force of the transmission gear 49 and the transmission gear 420 is small, the relative rotational speed between the transmission gear 49 and the transmission gear 420 after the dog disengagement becomes low. For this reason, the engaging portions of the transmission gear 49 and the transmission gear 420 are unlikely to repel each other. The clunking noise at the time of the dog engagement is unlikely to occur. On the other hand, when the engaging force of the transmission gear 49 and the transmission gear 420 is small, the engine rotational speed is low in many cases, and the clunking noise at the time of the dog engagement tends to be noticeable. So, if the state of the motorcycle 1 is determined to be the second state, the second gear shifting control unit 96 executes the second gear shifting control process in which the shift actuator 70 is controlled in such a manner that the rotational speed of the shift drum 421 becomes relatively slow.

Next, the shifting control process of the automatic transmission apparatus 50 according to the present preferred embodiment will be described with reference to the flowchart of FIG. 5. First, at step S100, the rider presses the shift-up switch or the shift-down switch, which are not shown in the drawings, and thereby the ECU 90 receives a gear shifting command signal.

Next, at step S110, the ECU 90 determines whether the motorcycle 1 is at a standstill or running. The specific method for the determining is not particularly limited. However, in the present preferred embodiment, the ECU 90 determines whether the motorcycle 1 is at a standstill or running preferably based on the vehicle speed detected by the vehicle speed sensor S23. For example, if the vehicle speed detected by the vehicle speed sensor S23 is equal to or lower than a predetermined value (for example, 0 km/h), the ECU 90 determines that the motorcycle 1 is at a standstill. On the other hand, if the vehicle speed detected by the vehicle speed sensor S23 is higher than the predetermined value, the ECU 90 determines that the motorcycle 1 is running. If it is determined that the motorcycle 1 is at a standstill as a result of the determination at step S110, the process proceeds to step S120. On the other hand, if it is determined that the motorcycle 1 is running, the process proceeds to step S130.

When the motorcycle 1 is at a standstill, the engaging force between the transmission gear 49 and the transmission gear 420 in the transmission mechanism 43 is believed to be small since the clutch 44 is disengaged. Accordingly, when the motorcycle 1 is at a standstill, the motorcycle 1 is assumed to be in the second state, in which the above-described engaging force is estimated to be less than the predetermined value. At step S120, assuming that the motorcycle 1 is in the second state, the ECU 90 executes the second gear shifting control process.

Figure 6A:
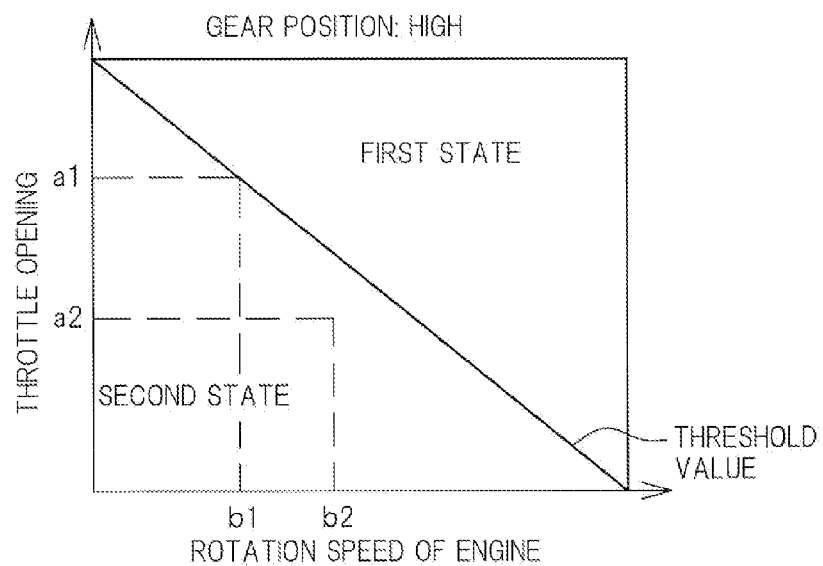
FIGS. 6A and 6B are graphs showing the relationship between the state of the motorcycle, the rotational speed of the engine, the opening of the throttle valve, and the gear shift position of the transmission mechanism.
Figure 6B:
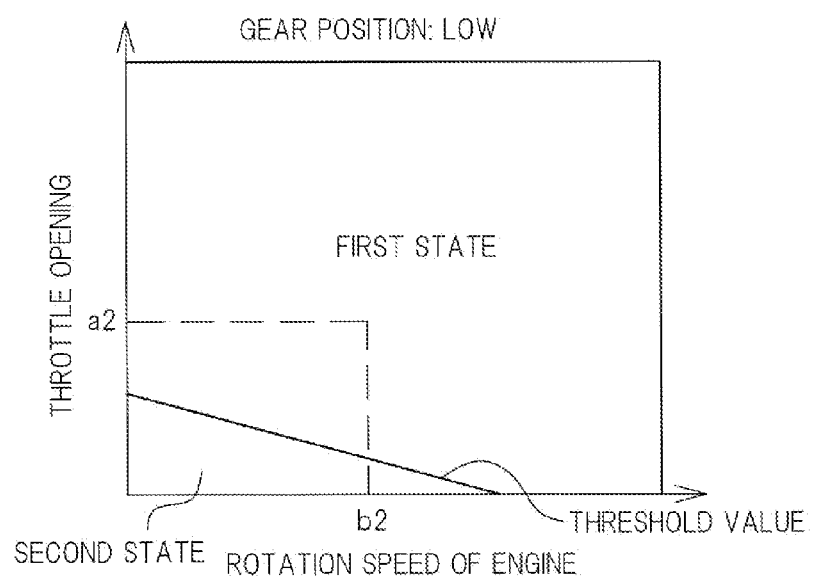

At step S130, the ECU 90 determines whether the motorcycle 1 is in the first state or in the second state based on the engine rotational speed, the degree of opening of the throttle valve 65 (hereafter simply referred to as the "throttle opening"), and the gear shift position of the transmission mechanism 43. FIGS. 6A and 6B are graphs showing the relationship between the state of the motorcycle 1, the engine rotational speed, the throttle opening, and the gear shift position of the transmission mechanism 43. FIG. 6A shows the case in which that the gear shift position is relatively high (for example, the gear shift position is in the fifth gear position), and FIG. 6B shows the case in which the gear shift position is relatively low (for example, the gear shift position is in the second gear position).

When both the gear shift position and the throttle opening are invariable, it is presumed that the lower the engine rotational speed, the smaller the engaging force between the transmission gear 49 and the transmission gear 420. For this reason, as illustrated in FIGS. 6A and 6B, when both the gear shift position and the throttle opening are invariable, the ECU 90 determines that the motorcycle is in the second state if the engine rotational speed is equal to or less than a threshold value. On the other hand, the ECU 90 determines that the motorcycle 1 is in the first state if the engine rotational speed is higher than a threshold value. For example, as shown in FIG. 6A, when the throttle opening is a1, it is determined that the motorcycle 1 is in the second state if the engine rotational speed is lower than the threshold value b1. On the other hand, if the engine rotational speed is greater than the threshold value b1, it is determined that the motorcycle 1 is in the first state. The threshold value is set so as to be greater when the throttle opening is smaller and to be greater when the gear shift position is higher.

When both the gear shift position and the engine rotational speed are invariable, it is presumed that the smaller the throttle opening, the smaller the engaging force between the transmission gear 49 and the transmission gear 420. For this reason, when both the gear shift position and the engine rotational speed are invariable, the ECU 90 determines that the motorcycle 1 is in the second state if the throttle opening is equal to or less than a threshold value. On the other hand, the ECU 90 determines that the motorcycle 1 is in the first state if the throttle opening is greater than a threshold value. For example, as shown in FIG. 6A, when the engine rotational speed is b1, it is determined that the motorcycle 1 is in the second state if the throttle opening is equal to or less than the threshold value a1. On the other hand, if the throttle opening is greater than the threshold value a1, it is determined that the motorcycle 1 is in the first state. The threshold value is set so as to be greater when the engine rotational speed is lower and to be greater when the gear shift position is higher.

In addition, when both the engine rotational speed and the throttle opening are invariable, it is presumed that the higher the transmission gear position, the smaller the engaging force between the transmission gear 49 and the transmission gear 420. For this reason, when both the engine rotational speed and the throttle opening are invariable, the ECU 90 determines that the motorcycle 1 is in the second state if the gear shift position is equal to or higher than a threshold value. On the other hand, the ECU 90 determines that the motorcycle 1 is in the first state if the gear shift position is less than a threshold value. For example, it is assumed that FIGS. 6A and 6B show the cases where the gear shift position is in the fifth gear position and the second position, respectively. It is also assumed that when the engine rotational speed is b2 and the throttle opening is a2, the threshold value of the gear shift position is the third gear position. In that case, as shown in FIG. 6A, it is determined that the motorcycle 1 is in the second state if the gear shift position is equal to or higher than the threshold value, the third gear position. As shown in FIG. 6B, it is determined that the motorcycle 1 is in the first state if the gear shift position is less than the third gear position. The graphs illustrating the relationship between the engine rotational speed, the throttle opening, and the state of the motorcycle 1 in the gear shift positions other than the second and fifth gear positions are omitted.

The relationship between the state of the motorcycle 1, the engine rotational speed, the throttle opening, and the gear shift position may be stored in a memory (not shown) of the ECU 90 in advance in the form of map, table, function formula, and the like. It may be defined in a control program to be executed by the ECU 90.

Thus, the ECU 90 determines whether the motorcycle 1 is in the first state or in the second state based on the engine rotational speed, the throttle opening, and the gear shift position. As illustrated in FIG. 5, if it is determined that the motorcycle 1 is in the first state as a result of the determination at step S130, the process proceeds to step S140, in which the ECU 90 executes the first gear shifting control process. If it is determined that the motorcycle 1 is in the second state as a result of the determination at step S130, the process proceeds to step S120, in which the ECU 90 executes the second gear shifting control process.

It should be noted that in the present preferred embodiment, the ECU 90 determines whether the motorcycle 1 is at a standstill or running at step S110. At step S130, the ECU 90 determines the state of the motorcycle 1 based on the engine rotational speed, the throttle opening, and the gear shift position of the transmission mechanism 43. In the present preferred embodiment, the control processes of step S110 and step S130 are performed, but the control process of step S130 may not be performed when the control process of step S110 is performed. On the other hand, the control process of step S110 may not be performed when the control process of step S130 is performed. Moreover, it is possible to perform the control process of step S110 after the control process of step S130.

In the first gear shifting control process and the second gear shifting control process, the ECU 90 controls the clutch actuator 60 so as to engage and disengage the clutch 44, and controls the shift actuator 70 so as to change the gear shift position of the transmission mechanism 43. More specifically, the ECU 90 drives the clutch actuator 60 to start disengaging the clutch 44. Thereafter, it drives the shift actuator 70 to change the gear shift position of the transmission mechanism 43. Then, after the gear shift position has been changed, it controls the clutch actuator 60 to engage the clutch 44.

The rotational speed of the shift drum 421 at the time when the transmission gear 49 and the transmission gear 420 come into engagement with each other is different between in the first gear shifting control process and in the second gear shifting control process. In the first gear shifting control process, the ECU 90 controls the shift actuator 70 so that the rotational speed of the shift drum 421 becomes the first rotational speed when the transmission gears 49 and 420 come into engagement with each other. In the second gear shifting control process, the ECU 90 controls the shift actuator 70 so that the rotational speed of the shift drum 421 becomes the first rotational speed when the transmission gears 49 and 420 come into engagement with each other.

When the first gear shifting control process of step S140 or the second gear shifting control process of step S120 finishes, the shifting control process of the automatic transmission apparatus 50 ends.

The ECU 90 functions as the determining unit 92 when executing the process of step S110 or step S130. In addition, the ECU 90 functions as the first gear shifting control unit 94 when executing the first gear shifting control process of step S140. The ECU 90 functions as the second gear shifting control unit 96 when executing the second gear shifting control process of step S120. The ECU 90 includes the determining unit 92 arranged to determine whether the motorcycle 1 is in the first state or in the second state, the first gear shifting control unit 94 arranged and programmed to execute the first gear shifting control process if it is determined as the first state, and the second gear shifting control unit 96 arranged and programmed to execute the second gear shifting control process if it is determined as the second state.

Figure 7:
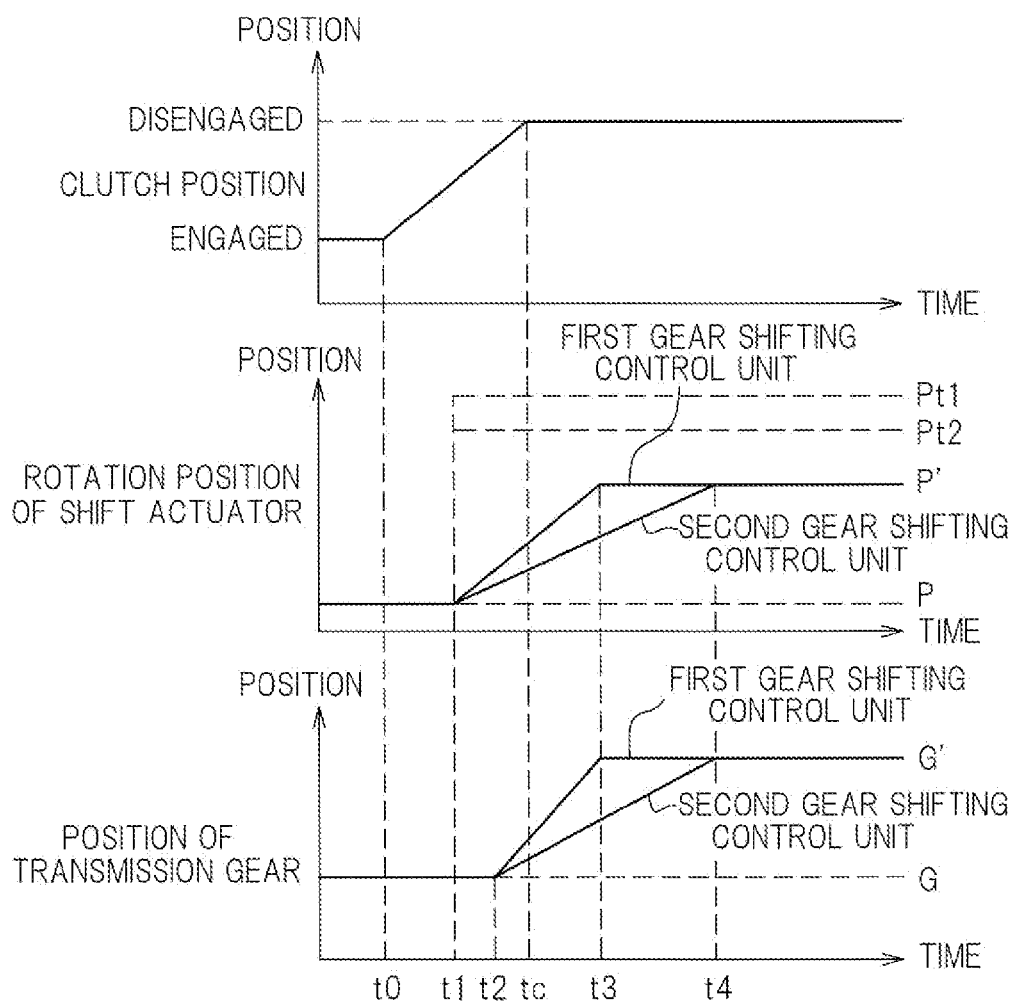
FIG. 7 includes charts showing changes over time of the clutch position, the rotational position of the shift actuator, and the position of one of a pair of transmission gears that needs to move, in the first gear shifting control process and the second gear shifting control process according to the first preferred embodiment of the present invention.

Next, one example of the first gear shifting control process and the second gear shifting control process will be described in detail. FIG. 7 includes charts showing changes over time of the clutch position, the rotational position of the shift actuator 70, and the position of the transmission gear (the one of the transmission gear 49 and the transmission gear 420 that needs to move), in one example of the first shifting control process and the second shifting control process. It should be noted that the shift drum 421 rotates in association with rotation of the shift actuator 70. Although not shown in FIG. 7, the rotational position of the shift drum 421 changes in a similar manner to the rotational position of the shift actuator 70.

The ECU 90 receives a gear shifting command at time to, and immediately drives the clutch actuator 60 to start disengaging the clutch 44. Next, the ECU 90 drives the shift actuator 70 at time t1, which is later than time t0. When driving the shift actuator 70, the shift drum 421 rotates, and the shift fork 422 moves according to the rotation of the shift drum 421. According to the movement of the shift fork 422, the transmission gear moves. However, since there exists some margin in the mechanism from the shift actuator 70 to the transmission gear, the transmission gear does not start moving immediately but starts moving at time t2, which is later than time t1.

The first gear shifting control unit 94 and the second gear shifting control unit 96 according to the present preferred embodiment are configured to cause the shift actuator 70 to operate at a constant speed. The operating speed of the shift actuator 70 controlled by the second gear shifting control unit 96 is slower than the operating speed of the shift actuator 70 controlled by the first gear shifting control unit 94. Accordingly, the rotational speed of the shift drum 421 in the second gear shifting control process is slower than the rotational speed of the shift drum 421 in the second gear shifting control process. The transmission gear moves from position G before gear shifting to position G' after gear shifting, but the transmission gear moving time in the first gear shifting control process (time t2-time t3) is shorter than the transmission gear moving time in the second gear shifting control process (time t2-time t4). Time t3, at which the transmission gear reaches position G' in the first gear shifting control process, is earlier than time t4, at which the transmission gear reaches position G' in the second gear shifting control process.

The dog disengagement is performed immediately after time t2. The dog engagement in the first gear shifting control process is performed just before time t3. The dog engagement in the second gear shifting control process is performed just before time t4. In the present preferred embodiment, the dog disengagement is performed during the time in which the clutch 44 is disengaged (time t0-time tc). The dog engagement is performed after the clutch 44 is disengaged (later than time tc).

Although not shown in the drawings, the ECU 90 drives the clutch actuator 60 after the transmission gear has reached position G' to engage the clutch 44. Thereby, the shifting control process is completed.

The operating speed of the shift actuator 70 may be changed by any method. In the present preferred embodiment, the operating speed is changed preferably by changing the target position of the shift actuator 70, as described below.

In the present preferred embodiment, the ECU 90 carries out a position feedback control process of the shift actuator 70. More specifically, the difference between the target position and the current position of the shift actuator 70 is calculated, and the shift actuator 70 is controlled so as to make the difference zero. The ECU 90 drives the shift actuator 70 in an amount obtained by multiplying the difference by a predetermined coefficient. Therefore, the greater the difference between the target position and the current position, the greater the amount of rotation of the shift actuator 70, meaning that the shift actuator 70 rotates more quickly. The first gear shifting control unit 94 sets the target position of the shift actuator 70 to a first target position Pt1. The second gear shifting control unit 96 sets the target position of the shift actuator 70 to a second target position Pt2, which is closer to the current position than is the first target position Pt1. As a result, the transmission gear moves quickly in the first gear shifting control process. On the other hand, the transmission gear moves slowly in the second gear shifting control process. When the transmission gear reaches position G', the transmission gear cannot move any further (see the figure on the right in FIG. 4). Thus, the rotational position of the shift actuator 70 is restricted to P', so the rotational position of the shift actuator 70 cannot reach the target positions Pt1 and Pt2.

It should be noted that how the ECU 90 controls the driving of the shift actuator 70 is not particularly limited. It is possible to adjust the driving amount of the shift actuator 70 by duty control, for example. It is also possible to adjust the just-mentioned driving amount by varying the voltage to be applied to the shift actuator 70, for example.

As described above, according to the present preferred embodiment, when the engaging force between the transmission gear 49 and the transmission gear 420 that have engaged with each other before gear shifting is great (i.e., is estimated to be equal to or greater than a predetermined value), the first gear shifting control process is executed. Therefore, the shift drum 421 rotates at a relatively high rotational speed. As a result, the dog disengagement can be carried out easily. Moreover, the moving speed of the transmission gear (the one of the transmission gear 49 and the transmission gear 420 that needs to move) is high, the engaging portions of the transmission gear 49 and the transmission gear 420 are unlikely to repel each other. The periodic noise resulting from the repelling of those engaging portions is significantly reduced and prevented. When the moving speed of the transmission gear is high, the clunking noise at the time of the dog engagement tends to be louder. However, when the motorcycle 1 is in the first state, the clunking noise at the time of the dog engagement is not particularly noticeable in comparison with the engine sound and the wind noise associated with the driving. For this reason, the clunking noise does not become an unpleasant noise.

On the other hand, when the engaging force between the transmission gear 49 and the transmission gear 420 that have engaged with each other before gear shifting is small (i.e., is estimated to be less than the predetermined value), the second gear shifting control process is executed. Therefore, the shift drum 421 rotates at a relatively low rotational speed. Even if the rotational speed of the shift drum 421 is low, the dog disengagement can be carried out easily because the above-mentioned engaging force is small. Moreover, when the above-mentioned engaging force is small, the relative rotational speed between the transmission gear 49 and the transmission gear 420 after the dog disengagement is low, so the engaging portions of the transmission gear 49 and the transmission gear 420 are unlikely to repel each other. The periodic noise resulting from the repelling of those engaging portions is significantly reduced and prevented. Also, when the motorcycle 1 is in the second state, the clunking noise at the time of the dog engagement tends to be noticeable because the engine sound and so forth are small. However, when the motorcycle 1 is in the second state, the clunking noise at the time of the dog engagement is small because the moving speed of the transmission gear is low. For this reason, the clunking noise does not become an unpleasant noise.

Hence, according to the present preferred embodiment, the clunking noise and the periodic noise at the time of the dog engagement can be prevented from becoming an unpleasant noise.

In the present preferred embodiment, the determining unit 92 detects whether or not the motorcycle 1 is at a standstill, and if at a standstill, the determining unit 92 determines that the motorcycle 1 is in the second state. When at a standstill, the engaging force between the transmission gears 49 and 420 having engaged with each other before gear shifting is small. Since the second gear shifting control process is executed when at a standstill, unpleasant noise at the time of dog engagement can be significantly reduced and prevented even when at a standstill. Note that even if the gear shifting operation is somewhat slow, it is not a practical problem when the motorcycle is at a standstill. Therefore, even if the rotational speed of the shift drum 421 is relatively low, no practical problem arises. Thus, the ECU 90 can perform the second gear shifting control process suitably.

In the present preferred embodiment, the determining unit 92 determines whether the motorcycle 1 is in the first state or in the second state based on the rotational speed of the engine 45, the degree of opening of the throttle valve 65, and the gear shift position of the transmission mechanism 43. By using the rotational speed of the engine 45, the degree of opening of the throttle valve 65, and the gear shift position of the transmission mechanism 43 in this way, the ECU 90 can estimate the magnitude of the above-mentioned engaging force suitably.

In the present preferred embodiment, the determining unit 92 determines that the state of the motorcycle 1 is the second state if the rotational speed of the engine 45 is equal to or less than a threshold value. The just-mentioned threshold value is set to be greater when the degree of opening of the throttle valve 65 is smaller and to be greater when the gear shift position of the transmission mechanism 43 is higher. When the rotational speed of the engine 45 is low (i.e., is equal to or less than a threshold value), the engaging force between the transmission gears 49 and 420 having engaged with each other before gear shifting is small. According to the present preferred embodiment, the second gear shifting control process is executed when the rotational speed of the engine 45 is low, and therefore, the unpleasant noise at the time of dog engagement can be reduced more suitably. Moreover, by appropriately setting the threshold value based on the degree of opening of the throttle valve 65 and the gear shift position of the transmission mechanism 43 as in the above-described manner, it is possible to appropriately set the threshold value according to the driving condition of the motorcycle 1. As a result, the state of the motorcycle 1 can be detected more reliably, and unpleasant noise can be reduced and prevented more effectively.

As illustrated in FIG. 7, in the present preferred embodiment, the second gear shifting control unit 96, like the first gear shifting control unit 94, is arranged and programmed to cause the shift actuator 70 to operate at a constant speed. It is conceivable that the operating speed of the shift actuator 70 in the second gear shifting control process may be made slower than the operating speed of the shift actuator 70 in the first gear shifting control process by other methods. For example, the following method may be possible. In the second gear shifting control process, while the transmission gear is moving from position G to position G', the shift actuator 70 is allowed to operate at the same speed as in the first gear shifting control process at a middle point (for example, before the dog engagement) and then the operating speed is reduced from the middle point. However, when the shift actuator 70 is operated at a constant speed during the second gear shifting control process as in the present preferred embodiment, the second gear shifting control process can be executed more easily.

As illustrated in FIG. 7, in the present preferred embodiment, the first gear shifting control unit 94 executes a position feedback control process so that the rotational position of the shift actuator 70 changes from the current position P to the first target rotational position Pt1. The second gear shifting control unit 96 executes a position feedback control process so that the rotational position P of the shift actuator 70 will be the second target position Pt2, which is closer to the current position P than is the first target position Pt1. Thus, the rotational speed of the shift drum 421 can be changed by a simple technique, that is, by changing the target rotational position in the position feedback control process.

As illustrated in FIG. 2, the automatic transmission apparatus 50 according to the present preferred embodiment includes the clutch 44 arranged to transmit and interrupt power of the mechanical power from the engine 45 of the motorcycle 1, and the clutch actuator 60 arranged to drive the clutch 44 separately from the shift actuator 70. The first gear shifting control unit 94 and the second gear shifting control unit 96 are arranged and programmed to allow the shift drum 421 to start rotating after the clutch actuator 60 starts disengaging the clutch 44 but before finishes disengaging. When the clutch operation and the shift operation are performed at the same time (in other words, in an overlapping manner), the disengagement of the clutch 44 has not been completed at the time of dog disengagement, so the dogs tend to be difficult to disengage. For this reason, when the engaging force between the transmission gears 49 and 420 is great, the time it takes to disengage the dogs tends to be longer, and the overall time of the gear shifting operation tends to be longer. However, according to the present preferred embodiment, when the motorcycle 1 is in the first state, in which the engaging force between the transmission gears 49 and 420 is great, the first gear shifting control process, in which the rotational speed of the shift drum 421 is high, is executed. Therefore, the time from the dog disengagement to the dog engagement can be made shorter. As a result, it is possible to prevent the overall time of the gear shifting operation from getting longer.

Thus, the motorcycle 1 according to the first preferred embodiment has been described hereinabove. It should be noted that the straddle-type vehicle according to the present invention is not limited to the motorcycle 1 of the present preferred embodiment, but may be embodied in various other types of preferred embodiments. Next, another preferred embodiment will be described briefly.

In the first preferred embodiment, the first gear shifting control unit 94 and the second gear shifting control unit 96 preferably are arranged and programmed to cause the shift actuator 70 to operate at a constant speed. Also, the operating speed of the shift actuator 70 controlled by the second gear shifting control unit 96 preferably is slower than the operating speed of the shift actuator 70 controlled by the first gear shifting control unit 94. In addition, in the first preferred embodiment, the shift actuator 70 is preferably driven using a position feedback control process. However, the automatic transmission apparatus according to the present invention is not limited to the above-described configurations. It is also possible to use an automatic transmission apparatus according to a second preferred embodiment, as shown in the following.

Next, the second preferred embodiment will be described. In the present preferred embodiment, the same elements as in the first preferred embodiment are designated by the same reference numerals and will not be further elaborated upon. FIG. 8 includes charts showing changes over time of the position of the clutch 44, the rotational position of the shift actuator 70, the position of the transmission gear (the one of the transmission gear 49 and the transmission gear 420 that needs to move), and the duty ratio, in one example of the second shifting control process.

In the present preferred embodiment, the shift drum 421 is driven by the shift actuator 70, as in the first preferred embodiment. The shift actuator 70 preferably is an electric motor. The second gear shifting control unit 96 of the ECU 90 adjusts the operating speed of the shift actuator 70 by performing duty control. The rotational speed of the shift drum 421 is adjusted by the above-mentioned adjustment. It should be noted that the duty control means a control process in which the duty ratio of the pulse wave for the shift actuator 70 is varied. The duty control is synonymous with a PWM (Pulse Width Modulation) control process.

The second gear shifting control unit 96 is arranged and programmed to operate the shift actuator 70 at a first operating speed and thereafter at a second operating speed that is slower than the first operating speed if the state of the motorcycle 1 is determined to be the second state by the determining unit 92. The first operating speed corresponds to a first duty ratio. The second operating speed corresponds to a second duty ratio. More specifically, the second gear shifting control unit 96 of the ECU 90 drives the shift actuator 70 with the first duty ratio and thereafter drives the shift actuator 70 with the second duty ratio. When the first duty ratio is a positive (plus) duty ratio, the second duty ratio is a negative (minus) duty ratio. On the other hand, when the first duty ratio is a negative (minus) duty ratio, the second duty ratio is a positive (plus) duty ratio. The absolute values of the first duty ratio and the second duty ratio may be either the same or different. It should be noted that the positive and negative relationship between the first duty ratio and the second duty ratio is not limited to the foregoing. When the first duty ratio is positive, the second duty ratio may also be positive. When the first duty ratio is negative, the second duty ratio may also be negative. In this case, the second duty ratio is less than the first duty ratio.

As illustrated in FIG. 8, the ECU 90 receives a gear shifting command at time t0, and immediately drives the clutch actuator 60. The clutch actuator 60 is actuated so that the clutch 44 starts to disengage. At this time, the duty ratio for the shift actuator 70 is 0%. Next, at time t1, which is later than time t0, the second gear shifting control unit 96 of the ECU 90 drives the shift actuator 70 with the first duty ratio D1 so that the rotational position of the shift actuator 70 changes from position P to position P'. When the shift actuator 70 is actuated, the shift drum 421 starts to rotate. Then, at time t2, which is later than time t1, the transmission gear starts to move. Then, at time t3, the second gear shifting control unit 96 of the ECU 90 switches the duty ratio over from the first duty ratio D1 to the second duty ratio D2. In the present preferred embodiment, time t3 is immediately before the dog engagement of the transmission gear is completed. However, time t3 may be at the start of the dog engagement or at a middle point of the dog engagement. The position of the transmission gear at time t3 (for example, the position thereof immediately before completing the dog engagement) can be detected by obtaining the time elapsed from the start of the shifting control. As another method of detecting the position of the transmission gear, the position of the transmission gear can also be detected by detecting the rotational position of the shift drum 421. It is possible to detect the rotational position of the shift drum 421 by a shift drum rotational position sensor (not shown) provided on the shift drum 421, or it is also possible to detect the rotational position of the shift drum 421 indirectly. As illustrated in FIG. 8, the first duty ratio D1 is positive, and the second duty ratio D2 is negative. By changing over the first duty ratio D1 and the second duty ratio D2, the direction in which the shift drum 421 is driven can be reversed. As a result, the shift drum 421 can be decelerated.

At time t4, in other words, at the time when the rotational position of the shift actuator 70 has reached position P' and the position of the transmission gear has reached position G', the second gear shifting control unit 96 of the ECU 90 ends the control process for the shift actuator 70. After time t4, the ECU 90 drives the shift actuator 70 at a third duty ratio D3.

In the present preferred embodiment, the second gear shifting control unit 96 preferably controls the shift actuator 70 to adjust the rotational speed of the shift actuator 70 by performing duty control. However, the method of controlling the shift actuator 70 is not limited to the duty control, but for example, the shift actuator 70 may be controlled by varying the voltage applied to the shift actuator 70.

As illustrated in FIG. 8, the second gear shifting control unit 96 is arranged and programmed to operate the shift actuator 70 at the first operating speed and thereafter operate it at the second operating speed that is slower than the first operating speed. With this configuration, the shift actuator 70 is operated at the first operating speed, which is relatively faster, at the time of dog disengagement. Therefore, the dog disengagement can be made easy. On the other hand, at the time of the dog engagement, the shift actuator 70 is operated at the second operating speed, which is relatively slower (i.e., slower than the first operating speed). Therefore, the clunking noise at the time of the dog engagement can be significantly reduced and prevented. The gear shifting operation time can be shortened in comparison with the case where the shift actuator 70 is operated at the second operating speed from the start of the dog disengagement to the completion of the dog engagement.

Moreover, as illustrated in FIG. 8, the second gear shifting control unit 96 of the present preferred embodiment drives the shift actuator 70 with the first duty ratio D1 and thereafter drives the shift actuator 70 with the second duty ratio D2 that is less than the first duty ratio D1. As a result, the second gear shifting control unit 96 can control the shift actuator 70 using the duty ratio, so it is possible to decelerate the shift actuator 70 immediately before the dog engagement of the transmission gear is completed with a simpler method.

Moreover, according to the present preferred embodiment, the second gear shifting control unit 96 drives the shift actuator 70 with a positive duty ratio (the first duty ratio D1) and thereafter drives the shift actuator 70 with a negative duty ratio (the second duty ratio D2). This enables application of a greater braking force to the electric motor immediately before the dog engagement is completed. As a result, clunking noise at the time of the dog engagement can be reduced and prevented more effectively. It should be noted that in the present preferred embodiment, the second duty ratio D2 preferably is a negative duty ratio. The value of the second duty ratio D2 preferably is such that the rotational direction of the shift drum 421 is not reversed, and the time during which the second duty ration D2 is applied preferably is such that the rotational direction of the shift drum 421 is not reversed.

In the first preferred embodiment, the first gear shifting control unit 94 and the second gear shifting control unit 96 preferably are arranged and programmed to cause the shift actuator 70 to operate at a constant speed by a position feedback control process, for example. However, the first gear shifting control unit 94 and the second gear shifting control unit 96 may drive the shift actuator 70 so that the rotational speed thereof is changed in a stepwise manner. The first rotational speed in this case refers to the mean value of the rotational speed of the shift drum 421 from the start to the end of the shifting control by the first gear shifting control unit 94. The second rotational speed refers to the mean value of the rotational speed of the shift drum 421 from the start to the end of the shifting control by the second gear shifting control unit 96.

In the above-described preferred embodiments, the rider preferably manually operates the shift switch, which is not shown in the drawings, to send a shift position change command to the ECU 90 so that the ECU 90 can drive the clutch actuator 60 and the shift actuator 70. However, in the present invention, it is also possible that the ECU 90 may automatically command the change of the shift position change and thereby drive the clutch actuator 60 and the shift actuator 70.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An automatic transmission apparatus to be mounted to a straddle-type vehicle, the automatic transmission apparatus comprising:
    a multi-speed transmission mechanism that includes a plurality of transmission gears arranged to engage with each other via a dog clutch and changes a combination of the engaging transmission gears in association with rotation of a shift drum;
    an actuator arranged to rotate the shift drum; and
    a control device arranged and programmed to control the actuator, the control device including:
        a determining unit arranged to detect a state of the straddle-type vehicle and to determine whether the straddle-type vehicle is in a first state in which an engaging force between the transmission gears having engaged with each other before gear shifting is estimated to be equal to or greater than a predetermined value or in a second state in which the engaging force is estimated to be less than the predetermined value;
        a first gear shifting control unit arranged and programmed to control the actuator so that, if the determining unit determines that the straddle-type vehicle is in the first state, a rotational speed of the shift drum becomes a first rotational speed when the transmission gears come into engagement with each other; and
        a second gear shifting control unit arranged and programmed to control the actuator so that, if the determining unit determines that the straddle-type vehicle is in the second state, the rotational speed of the shift drum becomes a second rotational speed that is lower than the first rotational speed when the transmission gears come into engagement with each other.

2. The automatic transmission apparatus according to claim 1, wherein the determining unit detects, as the state of the straddle-type vehicle, whether or not the straddle-type vehicle is at a standstill, and if the straddle-type vehicle is at a standstill, the determining unit determines that the straddle-type vehicle is in the second state.

3. The automatic transmission apparatus according to claim 1, wherein:
    the straddle-type vehicle includes an engine and a throttle valve disposed in an intake pipe of the engine; and
    the automatic transmission apparatus further includes:
        an engine rotational speed sensor arranged to detect a rotational speed of the engine;
        a throttle opening sensor to detect a degree of opening of the throttle valve; and
        a gear shift position sensor arranged to detect a gear shift position of the transmission mechanism; wherein
        the determining unit is configured to detect the state of the straddle-type vehicle based on the rotational speed of the engine, the degree of opening of the throttle valve, and the gear shift position of the transmission mechanism.

4. The automatic transmission apparatus according to claim 3, wherein:

the determining unit is configured to determine that the straddle-type vehicle is in the second state when the rotational speed of the engine is equal to or less than a threshold value; and the threshold value is set to be greater when the degree of opening of the throttle valve is smaller than the threshold value set when the degree of opening of the throttle value is larger, and set to be greater when the gear shift position of the transmission mechanism is higher than the threshold value set when the gear shift position of the transmission mechanism is lower.

5. The automatic transmission apparatus according to claim 3, wherein:

the determining unit is configured to determine that the straddle-type vehicle is in the second state when the degree of opening of the throttle valve is equal to or less than a threshold value; and the threshold value is set to be greater when the rotational speed of the engine is slower than the threshold value set when the rotational speed of the engine is faster, and set to be greater when the gear shift position of the transmission mechanism is higher than the threshold value set when the gear shift position of the transmission mechanism is lower.

6. The automatic transmission apparatus according to claim 3, wherein:

the determining unit is configured to determine that the straddle-type vehicle is in the second state when the gear shift position of the transmission mechanism is equal to or higher than a threshold value; and the threshold value is set to be smaller when the rotational speed of the engine is slower than the threshold value set when the rotational speed of the engine is higher, and set to be smaller when the degree of opening of the throttle valve is smaller than the threshold value set when the degree of opening of the throttle value is larger.

7. The automatic transmission apparatus according to claim 1, wherein:

each of the first gear shifting control unit and the second gear shifting control unit are arranged and programmed to cause the actuator to operate at a constant speed; and an operating speed of the actuator controlled by the second gear shifting control unit is lower than the operating speed of the actuator controlled by the first gear shifting control unit.

8. The automatic transmission apparatus according to claim 1, wherein the second gear shifting control unit is arranged and programmed to operate the actuator at a first operating speed and thereafter operate the actuator at a second operating speed that is slower than the first operating speed.

9. The automatic transmission apparatus according to claim 1, wherein:

the actuator includes an electric motor;

the first gear shifting control unit executes a position feedback control process so that a rotational position of the electric motor changes from a current position to a first target rotational position; and the second gear shifting control unit executes the position feedback control process so that the rotational position of the electric motor changes to a second target rotational position closer to the current position than the first target rotational position.

10. The automatic transmission apparatus according to claim 1, wherein:

the actuator includes an electric motor; and the second gear shifting control unit drives the electric motor with a first duty ratio and thereafter drives the electric motor with a second duty ratio that is less than the first duty ratio.

11. The automatic transmission apparatus according to claim 1, wherein:

the actuator includes an electric motor; and the second gear shifting control unit drives the electric motor with one of a positive duty ratio and a negative duty ratio and thereafter drives the electric motor with the other one of the positive duty ratio and the negative duty ratio.

12. The automatic transmission apparatus according to claim 1, further comprising:

a clutch arranged to transmit and interrupt power of an engine of the straddle-type vehicle; and an additional actuator arranged to drive the clutch; wherein the first gear shifting control unit and the second gear shifting control unit are arranged and programmed to cause the shift drum to start rotating after the additional actuator starts to disengage the clutch but before the additional actuator finishes disengaging the clutch.

13. A straddle-type vehicle comprising:

an automatic transmission apparatus to be mounted to a straddle-type vehicle, the automatic transmission apparatus comprising:

a multi-speed transmission mechanism that includes a plurality of transmission gears arranged to engage with each other via a dog clutch and changes a combination of the engaging transmission gears in association with rotation of a shift drum;

an actuator arranged to rotate the shift drum; and a control device arranged and programmed to control the actuator, the control device including:

a determining unit arranged to detect a state of the straddle-type vehicle and to determine whether the straddle-type vehicle is in a first state in which an engaging force between the transmission gears having engaged with each other before gear shifting is estimated to be equal to or greater than a predetermined value or in a second state in which the engaging force is estimated to be less than the predetermined value;

a first gear shifting control unit arranged and programmed to control the actuator so that, if the determining unit determines that the straddle-type vehicle is in the first state, a rotational speed of the shift drum becomes a first rotational speed when the transmission gears come into engagement with each other; and a second gear shifting control unit arranged and programmed to control the actuator so that, if the determining unit determines that the straddle-type vehicle is in the second state, the rotational speed of the shift drum becomes a second rotational speed that is lower than the first rotational speed when the transmission gears come into engagement with each other.

* * * * *